(12) United States Patent
Yamashita et al.

(10) Patent No.: US 8,387,246 B2
(45) Date of Patent: Mar. 5, 2013

(54) SHAFT MEMBER FOR FLUID LUBRICATION BEARING APPARATUSES AND A METHOD FOR PRODUCING THE SAME

(75) Inventors: Nobuyoshi Yamashita, Kuwana (JP); Natsuhiko Mori, Kuwana (JP); Toshiyuki Mizutani, Kuwana (JP); Takeshi Shimazaki, Awara (JP); Koji Yamagata, Awara (JP)

(73) Assignees: NTN Corporation, Osaka (JP); Fukui Byora Co., Ltd., Fukui (JP)

( * ) Notice: Subject to any disclaimer, the term of this patent is extended or adjusted under 35 U.S.C. 154(b) by 0 days.

(21) Appl. No.: 13/090,452

(22) Filed: Apr. 20, 2011

(65) Prior Publication Data

US 2011/0192210 A1     Aug. 11, 2011

Related U.S. Application Data

(62) Division of application No. 11/630,410, filed as application No. PCT/JP2005/016399 on Sep. 7, 2005, now abandoned.

(30) Foreign Application Priority Data

Sep. 8, 2004 (JP) ................................. 2004-261436
Sep. 8, 2004 (JP) ................................. 2004-261457

(51) Int. Cl.
*B21K 1/12* (2006.01)
(52) U.S. Cl. ............... 29/890.02; 72/352; 384/100
(58) Field of Classification Search ............. 29/898.02; 72/352–359, 342.8; 310/90; 384/100, 101, 384/113, 114
See application file for complete search history.

(56) References Cited

U.S. PATENT DOCUMENTS

| | | | | |
|---|---|---|---|---|
| 1,416,846 A | * | 5/1922 | Leighton | 384/625 |
| 1,691,878 A | * | 11/1928 | Blakeslee | 72/327 |
| 1,929,802 A | * | 10/1933 | Brauchler | 72/327 |
| 2,526,489 A | * | 10/1950 | Liddicoat | 72/344 |
| 2,781,903 A | * | 2/1957 | Buffet et al. | 72/256 |
| 3,126,561 A | * | 3/1964 | Orloff | 470/11 |
| 3,396,567 A | * | 8/1968 | Bachmann | 72/318 |
| 3,603,275 A | * | 9/1971 | Eickenhorst et al. | 72/352 |
| 3,796,082 A | * | 3/1974 | Honsinger et al. | 72/256 |

(Continued)

FOREIGN PATENT DOCUMENTS

| | | |
|---|---|---|
| CN | 1482373 | 3/2004 |
| JP | 55-094749 | 7/1980 |

(Continued)

OTHER PUBLICATIONS

International Search Report issued Dec. 13, 2005 in International (PCT) Application No. PCT/JP2005/016399.

(Continued)

*Primary Examiner* — David Bryant
*Assistant Examiner* — Jason L Vaughan
(74) *Attorney, Agent, or Firm* — Wenderoth, Lind & Ponack, L.L.P.

(57) ABSTRACT

A low-cost shaft member for hydrodynamic bearing apparatuses restores the pressure balance in a thrust bearing gap formed on both axial sides of the flange portion in an early stage. A shaft material integrally having a shaft portion and a flange portion with a through-hole between both end faces of the flange portion is formed in a common forging step. As a result, the through-hole is formed to open to an inner diameter side of the bearing gaps avoiding the thrust bearing gaps formed on both end faces of the flange portion of the shaft member as a finished product.

3 Claims, 13 Drawing Sheets

U.S. PATENT DOCUMENTS

| | | | | |
|---|---|---|---|---|
| 3,844,155 A * | 10/1974 | Bew et al. | | 72/356 |
| 4,312,210 A * | 1/1982 | Nishizawa et al. | | 72/267 |
| 4,434,640 A * | 3/1984 | Walter et al. | | 72/348 |
| 4,435,973 A * | 3/1984 | Nakazawa et al. | | 72/327 |
| 4,838,062 A * | 6/1989 | Prenn | | 72/41 |
| 4,967,584 A * | 11/1990 | Sato et al. | | 72/356 |
| 5,195,349 A * | 3/1993 | Ishinaga et al. | | 72/359 |
| 5,895,324 A * | 4/1999 | Inada | | 470/11 |
| 5,946,963 A * | 9/1999 | Suzuki et al. | | 72/344 |
| 6,000,269 A * | 12/1999 | Kataoka | | 72/352 |
| 6,004,036 A | 12/1999 | Kloeppel et al. | | |
| 6,053,023 A * | 4/2000 | Landrum | | 72/355.4 |
| 6,250,807 B1 * | 6/2001 | Mori et al. | | 384/100 |
| 6,361,216 B1 * | 3/2002 | Takahashi et al. | | 384/123 |
| 6,675,475 B2 * | 1/2004 | Sugiura et al. | | 29/888.022 |
| 6,836,040 B2 * | 12/2004 | Watanabe et al. | | 310/90 |
| 6,939,046 B2 * | 9/2005 | Oelsch | | 384/100 |
| 6,948,852 B2 * | 9/2005 | Oelsch | | 384/100 |
| 7,219,524 B2 * | 5/2007 | Miyashita et al. | | 72/340 |
| 7,454,941 B2 * | 11/2008 | Bergue et al. | | 72/359 |
| 7,841,062 B2 * | 11/2010 | Bergue et al. | | 29/458 |
| 2001/0025420 A1 | 10/2001 | Usui | | |
| 2002/0064324 A1 | 5/2002 | Yamada | | |
| 2003/0185473 A1 | 10/2003 | Gomyo | | |
| 2003/0213128 A1 * | 11/2003 | Kaimi et al. | | 29/898.02 |
| 2003/0231813 A1 | 12/2003 | Gomyo et al. | | |
| 2004/0008911 A1 * | 1/2004 | Oelsch | | 384/100 |
| 2004/0028301 A1 | 2/2004 | Kull et al. | | |
| 2005/0268466 A1 * | 12/2005 | Miki | | 29/898.02 |
| 2006/0185415 A1 * | 8/2006 | Bergue et al. | | 72/347 |

FOREIGN PATENT DOCUMENTS

| | | | | |
|---|---|---|---|---|
| JP | 55128341 A | * | 10/1980 | |
| JP | 56009028 A | * | 1/1981 | |
| JP | 61266141 A | * | 11/1986 | |
| JP | 62077144 A | * | 4/1987 | |
| JP | 62187541 A | * | 8/1987 | |
| JP | 03204133 A | * | 9/1991 | |
| JP | 05154598 A | * | 6/1993 | |
| JP | 11-191943 | | 7/1999 | |
| JP | 2000-117384 | | 4/2000 | |
| JP | 2000-235766 | | 8/2000 | |
| JP | 2001-20945 | | 1/2001 | |
| JP | 2001-280338 | | 10/2001 | |
| JP | 2002-061641 | | 2/2002 | |
| JP | 2002-130258 | | 5/2002 | |
| JP | 2002-155943 | | 5/2002 | |
| JP | 2002-168240 | | 6/2002 | |
| JP | 2003-139131 | | 5/2003 | |
| JP | 2003-214434 | | 7/2003 | |
| JP | 2003-262219 | | 9/2003 | |
| JP | 2004-347126 | | 12/2004 | |

OTHER PUBLICATIONS

Chinese Office Action issued May 8, 2009 for Chinese Application No. 200580025273.0.

Liu Faxiu, "Calculation of Blank Dimension of Screw Thread Before Rolling Process", Journal of Shaoyang College, Dec. 13, 1997, vol. 10, No. 1, pp. 21-25, with English translation.

International Preliminary Report on Patentability and Written Opinion of the International Searching Authority issued Mar. 20, 2007 in International (PCT) Application No. PCT/JP2005/016399.

Japanese Office Action dated Aug. 10, 2010 issued in corresponding Japanese Patent Application No. 2005-259794 w/partial translation.

* cited by examiner

SHAFT MEMBER FOR FLUID LUBRICATION BEARING APPARATUSES AND A METHOD FOR PRODUCING THE SAME

This application is a divisional of Ser. No. 11/630,410 filed on Jun. 13, 2007, now abandoned which is a National Stage Application of International Application Serial No. PCT/JP2005/016399, filed Sep. 7, 2005.

BACKGROUND OF THE INVENTION

The present invention relates to a shaft member for fluid lubrication bearing apparatuses which relatively rotatably supports a shaft member in the radial direction by a lubricating film of a fluid which occurs in a radial bearing gap and a method for producing the same.

Fluid lubrication bearings of this type are roughly classified into two groups: a hydrodynamic bearing comprising a hydrodynamic pressure producing means for producing hydrodynamic pressure in a lubricating oil in a bearing gap; and so-called cylindrical bearings (bearings comprising a perfectly circular bearing face) not comprising a hydrodynamic pressure producing means.

For example, a fluid lubrication bearing apparatus incorporated in a spindle motor of a disk drive unit such as HDD is provided with a radial bearing portion which rotatably supports a shaft member in the radial direction in a non-contact manner; and a thrust bearing portion which rotatably supports the shaft member in the thrust direction in a non-contact manner. a bearing (hydrodynamic bearing) which is provided with grooves for producing a hydrodynamic pressure (hydrodynamic groove) on the inner periphery face of a bearing sleeve or on the outer circumferential surface of the shaft member is used as a radial bearing portion. As a thrust bearing portion, for example, both end faces of the flange portion of the shaft member or a hydrodynamic bearing provided with hydrodynamic grooves on the face facing it (an end face of the bearing sleeve, an end face of a bottom member fixed on a housing, the inner bottom face of the bottom of the housing or the like) is used (for example, refer to patent document 1: Japanese Unexamined Patent Publication No. 2002-61641). Alternatively, as the thrust bearing portion, a bearing having the structure in which one end face of the shaft member is supported in a contact manner by a bottom member (so-called pivot bearing) is used in some cases (for example, refer to patent document 2: Japanese Unexamined Patent Publication No. 1999-191943).

In a spindle motor of this type, a clamper for clamping a disk-shaped information recording medium such as magnetic disks (hereinafter referred to simply as a disk) between a disk hub and itself is attached to the edge of the shaft member. The clamper is attached on the shaft member by screwing into a threaded hole formed on one edge of the shaft member through the clamper (for example, refer to patent document 3: Japanese Unexamined Patent Publication No. 2000-235766).

Recently, to deal with increased information recording density and higher rotational speed in information appliances, higher rotational accuracy is required for the above spindle motor for information appliances. To meet this demand, higher rotational accuracy is also required for a fluid lubrication bearing apparatus incorporated into the above spindle motor. At the same time, with the demand for lower price of information appliances, reduced production costs of the above fluid lubrication bearing apparatus are strongly desired recently.

In order to stably provide the rotational performance of a fluid lubrication bearing apparatus (hydrodynamic bearing apparatus) for the long term, it is important to control the radial bearing gap and thrust bearing gap, in which the pressure of the fluid for supporting the shaft member is present, to be highly accurate. For example, when the thrust bearing gap is formed on both side of the flange portion in the axial direction as mentioned above, to maintain the thrust support of the shaft member in a stable state, the pressure for the thrust support on one end face side of the flange portion and the pressure for thrust support on the other end face side need to be brought into balance so that the sliding contact of the end face of the flange portion and the face facing it is avoided as much as possible. Higher accuracy of the thrust bearing gap can be achieved by processing the end face of the flange portion facing this, hydrodynamic grooves and the like highly accurately, but merely increasing processing accuracy will inappropriately result in higher costs.

Moreover, examples of methods for forming a threaded hole on the shaft member include a method comprising forming a prepared hole of the threaded hole on the shaft material by cutting, and a thread cutting is worked relative to this prepared hole. However, by this method, cutting powders produced when the prepared hole is cut are accumulated at the bottom of the threaded hole, and cutting powders cannot be completely removed even if the threaded hole is cleaned after the process. Accordingly, the cutting powders remaining inside the threaded hole deposit to other components as contaminants when other components are mounted or a bearing apparatus is assembled, and may get in the fluid (for example, lubricating oil, etc.) filling the inside of the bearing apparatus after being assembled. Alternatively, if the cutting powders deposited to other components (contamination) are further transferred to disks, they may cause disk crash. Moreover, removal of cutting powders requires complicated and numerous cleaning steps, leading to an increase in costs.

Moreover, to deal with cost reduction required for the above fluid lubrication bearing apparatus, various cost reducing measures are examined for the component parts of fluid lubrication bearing apparatuses. For example, as for the shaft member, an article comprising the shaft portion and the flange portion integrally formed by forging to produce a near net shape is known (for example, refer to patent document 4: Japanese Unexamined Patent Publication No. 2004-347126).

BRIEF SUMMARY OF THE INVENTION

On one hand, forging is a method having excellent processability and cost performance as mentioned above, but on the other hand, due to its characteristics, required dimensional accuracy may not be obtained depending on the shape of the shaft member.

More specifically, the forging process includes compressing a material to deform it in a specific direction into a predetermined shape. For example, when the pressing direction in forging is the same as the longitudinal direction of the material, compressive force imparted to one end of the material is not sufficiently transmitted to the other end, and thus plastic flow at the other end may be rendered insufficient. This prevents the deformation enough to attain a desired shape, preventing to obtain high forming accuracy.

In particular, with recent demand for increased capacity disk apparatuses, a fluid lubrication bearing apparatus (hydrodynamic bearing apparatus) which can load a plurality of disks and is integrated in a spindle motor, the use of an elongated shaft member compared to those known is examined to cope with an increase in moment load. However, its elongation tends to cause problems in the plastic flow abobe mentioned more evidently. Therefore, it is difficult to produce a shaft member having both elongated length and high dimensional accuracy at low costs at the moment.

A first object of the present invention is to provide a shaft member for hydrodynamic bearing apparatuses which can restore the pressure balance in a thrust bearing gap formed on both side of a flange portion in the axial direction in an early stage at low costs.

A second object of the present invention is to provide a shaft member for fluid lubrication bearing apparatuses which can prevent contaminants from depositing to bearing component parts and prevent contaminants from getting inside a bearing apparatus as much as possible at low costs.

A third object of the present invention is to provide a shaft member for fluid lubrication bearing apparatuses which has high dimensional accuracy and can be elongated at low costs.

To achieve the first object, the present invention provides a shaft member for hydrodynamic bearing apparatuses, the shaft member comprising a flange portion and being supported in a non-contact manner in the thrust direction by the pressure produced by hydrodynamic effect of a fluid which occurs in a thrust bearing gap on both axial sides of the flange portion, a through-hole opening to its both end faces being formed on the flange portion, and the inner periphery of the through-hole being processed by plastic processing.

In the present invention, as stated above, a through-hole opening to its both end faces is formed on the flange portion. Hence, when the fluid pressure in the thrust bearing gap on an axial end side is extremely increased for any reason, the fluid (for example, lubricating oil) flows into the thrust bearing gap on the other axial end side via the through-hole formed on the flange portion. Accordingly, pressure balance in both thrust bearing gaps is restored at an early stage to maintain the width of the thrust bearing gaps appropriately, and the sliding friction between the end face of the flange portion and the face facing it can be prevented beforehand.

An example of the methods of forming the through-hole on the flange portion includes cutting. However, cutting suffers a long cycle time, whereby processing efficiency is lowered and costs are increased. Moreover, cutting inevitably produces cutting powders, which may get in the fluid as contaminants. In order to prevent this contamination, a cleaning process of the shaft member needs to be additionally performed after cutting, resulting in increased costs. In particular, as the diameter of the flange portion is several millimeters in the above hydrodynamic bearing apparatus used in information appliances, the diameter of the through-hole will be as minute as several tens to several hundreds micrometers accordingly. In this case, it is difficult to completely remove cutting powders after cutting, and therefore a careful cleaning step or other process is necessary, which inevitably raises the costs.

In contrast, plastic processing typically including forging have a shorter cycle time compared to cutting in general, and can process very efficiently. Moreover, since cutting powders are not produced unlike in cutting, the cleaning step is unnecessary. Therefore, forming the through-hole by plastic processing can greatly reduce the costs. In this case, the inner periphery of the through-hole will be a face subjected to plastic processing. As a face subjected to plastic processing has a low level of roughness, smooth flow of the fluid in the through-hole without performing a special post-treatment can be ensured.

The through-hole is desirably formed in the vicinity of the shaft portion. By forming the through-hole in the vicinity of the shaft portion, the passage of the fluid between the two thrust bearing gaps is also ensured on the inner diameter side of the flange portion. The regulating function of the pressure balance between the two thrust bearing gaps can be increased, as well as the fluid passage (an annular gap between the outer circumferential surface of the flange portion and the inner periphery face of the housing) on the outer diameter side of the flange portion which is originally there. From this perspective, the through-hole desirably opens to the inner diameter side of the radial center of the thrust bearing gap. In this case, the through-hole is desirably disposed so that it opens at a position avoiding the thrust bearing gap between the region in which the hydrodynamic grooves are formed and the face facing it (the inner diameter side of the thrust bearing gap) to prevent the so-called drop of the hydrodynamic pressure (loss of the hydrodynamic pressure). If it is difficult to make the through-hole open to said position due to a spatial limit or any other factor, it may open to a position overlapping the thrust bearing gap. However, it is desirable to avoid, if possible, a drop in the hydrodynamic pressure also in this case.

The above shaft member for hydrodynamic bearing apparatuses, for example, can be provided as a hydrodynamic bearing apparatus comprising a shaft member; a bearing sleeve into which this shaft member is inserted at its inner periphery; a radial bearing portion which produces pressure by the hydrodynamic effect of a fluid which occurs in a radial bearing gap between the outer periphery of the shaft portion and the inner periphery of the bearing sleeve to support the shaft portion in the radial direction in a non-contact manner; a first thrust bearing portion which produces pressure by the hydrodynamic effect of a fluid which occurs in a thrust bearing gap on one end side of the flange portion to support the flange portion in the thrust direction in a non-contact manner; and a second thrust bearing portion which produces pressure by the hydrodynamic effect of the fluid occurring in the thrust bearing gap on the other end side of the flange portion to support the flange portion in the thrust direction in a non-contact manner.

The fluid is caused to flow in the axial direction in the radial bearing gap by forming hydrodynamic grooves asymmetrically in the axial direction for producing the hydrodynamic effect of the fluid on one of the outer circumferential surface of the shaft portion facing the radial bearing gap and the inner periphery face of the bearing sleeve opposing this outer circumferential surface. If this flow is directed to the flange portion, the occurrence of negative pressure in the bearing apparatus can be avoided, and the function of the through-hole to regulate the pressure balance equilibrates high pressure caused by pushing to the flange portion.

The above hydrodynamic bearing apparatus can be also presented as a motor which comprises a hydrodynamic bearing apparatus, rotor magnet and stator coil.

Moreover, to achieve the first object, the present invention provides a method for producing a shaft member for hydrodynamic bearing apparatuses which comprises a shaft portion and a flange portion and is supported in the thrust direction in a non-contact manner by the hydrodynamic effect of a fluid which occurs in the thrust bearing gap on both axial sides of the flange portion. The method comprises integrally forming the shaft portion and the flange portion by forging and forming a through-hole opening to both of the end faces of the flange portion by forging, the forging being performed simultaneously. As mentioned above, the forming of the through-hole is performed by a forging process so that cutting powders and the like associated with the cutting process can be prevented, and a cleaning step after the cutting process can be omitted or simplified. Moreover, the forming of the through-hole and the forming of the shaft material comprising the shaft portion and the flange portion integrally are both performed simultaneously by forging, whereby the processing steps can be simplified and the time for the process can be greatly shortened.

To achieve the second object, the present invention provides a metallic shaft member for fluid lubrication bearing apparatuses in which a threaded hole is formed on its one end and a radial bearing face facing the radial bearing gap is formed on the outer periphery, the threaded hole being formed by plastic processing. Herein, the radial bearing face may be any that faces the radial bearing gap which produces a hydrodynamic effect, regardless of whether or not the hydrodynamic grooves for producing the hydrodynamic effect are formed.

As mentioned above, the threaded hole is formed by plastic processing in the present invention. Therefore, cutting needs not be performed to form the threaded hole, cutting powders produced by cutting can be prevented. Accordingly, cutting powders do not remain inside the threaded hole. Furthermore, cutting powders can be prevented from depositing to other components as contaminants when other components are mounted or a bearing apparatus is assembled and from getting in a lubricating oil or the like filling the inside of the bearing apparatus after being assembled. Moreover, unlike in cutting, since cutting powders are not produced in a large amount, the cleaning step can be simplified and related forming costs can be reduced.

The threaded hole can be, for example, so constructed that it has a prepared hole formed by a forging process and a thread portion formed by rolling process on the opening side of the prepared hole. In this case, as plastic processing, a forging process is performed on the prepared hole, and a rolling process is performed on the thread portion. The prepared hole by the forging process is formed in a series from the shaft ends. After this prepared hole is formed, the opening side of the prepared hole is partially subjected to screw rolling so that the final threaded hole is constituted by the thread portion on the opening side and the unrolled prepared hole remaining on the bottom side of the hole. Because this threaded hole is formed only by plastic processing, production of cutting powders can be prevented and the problem of contamination can be solved. Moreover, a shaft material having a shape corresponding to the shaft member, for example, the shaft material which integrally has the shaft portion and flange portion can be formed by forging.

Moreover, since the above threaded hole is for fixing other components on the shaft member, the accuracy of the perpendicularity of the shaft member and other components screw-fixed on the shaft member varies depending on how the threaded hole is inclined relative to the shaft member. An example of the methods for suppressing the inclination of the threaded hole relative to the shaft member is increasing the processing accuracy of the prepared hole which serves as the reference in processing the thread portion of the threaded hole. When the prepared hole is formed by a forging process as in the present invention, the method by which a pin for forming the prepared hole is pushed into the shaft material to cause the pushing portion to undergo plastic deformation is employed. However, if an edge is formed between a conical end face of the pin tip and a cylindrical outer circumferential surface positioned on its proximal end side (connecting portion), when the pin is pushed, a great amount of stress is concentrated at a portion corresponding to the edge of the shaft material (for example, a portion which is deformed in conformity with the edge formed at the connecting portion between the pin tip face and the outer circumferential surface of the shaft material). If a raw material forming the shaft material is, for example, stainless steel or like material with poor ductility, this trend becomes more evident. In its worst case, cracks are formed at the portion where stress is concentrated. In consideration of this problem, the prepared hole of the threaded hole is shaped so that it has a conical surface and a cylinder face which is disposed on the opening side of this conical surface and is smoothly continuous with the conical surface via a radially curved surface in the present invention.

Since the shape of the prepared hole is correspondent to the shape deformed in conformity with the surface shape of the pin for forming the prepared hole, such a constitution means that the tip portion of the pin is in a conical surface shape, and that the conical surface of the tip portion of the pin is smoothly continuous with the cylindrical outer circumferential surface via the radially curved surface. Therefore, when the pin having the above-mentioned shape is pushed into the shaft material, a portion corresponding to the connecting portion between the pin tip face of the shaft material and the outer circumferential surface of the cylinder is deformed in conformity with the smooth connecting portion of the pin, and the concentrated stress at the portion corresponding to this connecting portion is mitigated. This can increase the yield rate of products in forming of the prepared hole, ensuring the formation of the prepared hole. Moreover, since the pushing direction of the pin is stabilized by forming the tip of the pin in a conical shape, runout of the tip can be prevented for accurate pushing of the pin into the shaft material, the dimensional accuracy of the prepared hole, in particular the inclination of the axis of the prepared hole relative to the axis of the shaft member can be suppressed to a low level.

Examples of more preferable shapes of the prepared hole include such a shape that the top of the conical surface formed at the bottom of the prepared hole is removed. The shape of a pin forming the material to be processed into this shape may be in such a shape that the tip portion of the pin in the form of a sharp cone is removed (for example, radially curved surface or a flat face). Accordingly, when the prepared hole is formed, not only at the portion corresponding to the connecting portion between the pin tip face of the shaft material and the outer circumferential surface of the cylinder, but also the stress concentrated at a portion corresponding to the pin tip face top can be mitigated, further ensuring forming of the prepared hole.

Moreover, when the shaft member is in rotation, high perpendicularity relative to the shaft member for a component is required fixed on the shaft member of the fluid lubrication bearing apparatus to avoid contact with components on the fixed side of the bearing apparatus, runout or prevent other problems. Accordingly, in the present invention, the coaxiality of the center line of the pitch circle of the thread portion in the threaded hole formed on the shaft member is set to 0.2 mm or lower. Herein, the coaxiality refers to the dimension of the deviation from the datum axis straight line of an axis (referring to the center line of the pitch circle of the thread portion herein) which is to be on the same straight line as the datum axis straight line (theoretically correct axis line as a geometric reference. Moreover, the term axis line used herein refers to an axis which is a geometrically correct straight line of the shaft member), and its dimension is represented by the diameter of the smallest geometrically correct cylinder which includes the entire above axis (pitch circle center line) and is coaxial with the datum axis straight line.

Accordingly, for example, the clamper for clamping the disk between the disk hub and itself is screw fixed on the shaft member with its clamping face perpendicularly intersecting the axis of the shaft member, the disk is fixed with its disk plane remaining parallel to the clamper and the clamping face of the disk hub. Accordingly, the disk can be fixed while the value of the perpendicularity relative to the shaft member is suppressed to a low level, and runout of the disk relative to the shaft member when the shaft member is in rotation can be suppressed.

Moreover, to achieve the second object, the present invention provides a method for producing a shaft member for fluid lubrication bearing apparatuses, the shaft member comprising a threaded hole formed on its one end and a radial bearing face facing a radial bearing gap formed on its outer periphery, the method comprising forming a prepared hole of the threaded hole by forging on a metallic shaft material, and then forming a thread portion in the prepared hole by rolling to form the threaded hole.

According to such a producing method, since forming of the threaded hole does not require cutting, cutting powders produced by cutting can be prevented. The cutting powders thus do not remain inside the threaded hole. In addition, the cutting powders are prevented from being deposited to other components as contaminants when other components are mounted or a bearing apparatus is assembled, causing disk crash or getting in a lubricating oil or the like filling the inside of the bearing apparatus after being assembled. Moreover, as mentioned above, instead of cutting, a forging process or a rolling process can be also used to shorten the cycle time and reduce material costs with an improved ratio of the amount of the material prior to the forming process to that after the process.

Moreover, the shaft material and the prepared hole can be formed in a common forging step. According to this method, because forming of the prepared hole and forming of the shaft material are performed both by forging, such a process can be performed at a time so that the forming step can be simplified.

The above shaft member for fluid lubrication bearing apparatuses can be provided as a fluid lubrication bearing apparatus comprising, for example, a shaft member for fluid lubrication bearing apparatuses; and a sleeve member into which this shaft member is inserted at its inner periphery and which forms the radial bearing gap between itself and the shaft member, the apparatus retaining the shaft member and sleeve member in a non-contact manner by a lubricating film of a fluid produced in the radial bearing gap.

Moreover, the above fluid lubrication bearing apparatus can be provided as a motor comprising this fluid lubrication bearing apparatus, a rotor magnet and a stator coil.

To achieve said third object, the present invention provides a metallic shaft member for fluid lubrication bearing apparatuses which comprises a shaft portion and a flange portion, at least the shaft portion being formed by forging, the shaft portion having a recess formed on its tip face, and the recess comprising a plastically processed surface.

Examples of means for achieving said object include a method of increasing the pressing pressure in forging. However, simply increasing pressing pressure may cause increased strain in the mold and raw materials, reduced mold life, cracks in raw materials, and various other problems. In contrast, in the present invention, since a concave comprising a plastically processed surface on the tip face of the shaft portion is formed, that is, the concave is formed by the plastic deformation of the tip portion of the shaft portion, the material which was originally in the concave is pushed out to the outer diameter side and the tip side by forming of the concave. Accordingly, the tip portion can be formed by minimizing the occurrence of shortage of the deformation amount at the tip portion by performing the forging process of the shaft portion and plastic processing of the concave. Therefore, when the shaft member is elongated, the deformation amount at the tip portion of the shaft portion can be ensured and high forming accuracy can be obtained throughout the length of the shaft portion. In addition, as mentioned above, since forming accuracy can be increased without increasing the pressing pressure, it is economical that no concern about reduced mold life, etc., is necessary.

A preferred concave formed on the tip face of the shaft portion, for example, has a shape whose diameter gradually decreases from the tip of the shaft portion toward the center of the shaft portion. This constitution has been created based on the tendency that its deformation shortage grows larger as it gets closer to the shaft end side when deformation is insufficient at the tip of the shaft portion. Accordingly, by forming a concave having such a shape, deformation shortage at the tip portion of the shaft portion can be efficiently compensated to form such a tip portion more accurately.

The shaft member having the above constitution can be provided as, for example, a fluid lubrication bearing apparatus comprising this shaft member; and a radial bearing gap formed between the outer circumferential surface of the shaft portion and the face facing it, the apparatus relatively rotatably supporting the shaft member by a lubricating film of a fluid which occurs in a radial bearing gap.

Moreover, to achieve said third object, the present invention provides a method for producing a metallic shaft member for fluid lubrication bearing apparatuses which comprises a shaft portion and a flange portion, the shaft portion being formed by forging, the process of the forging comprising forming a concave by plastic processing on the tip face of the shaft portion to cause the tip portion of the shaft portion to overhang by a plastic flow.

As mentioned above, in the process of the forging of the shaft portion, when the concave is formed by plastic processing, for example, the tip portion of the shaft portion is preferably caused to overhang until it reaches at least final finished shape. Normally, the shaft member of this type is finished by grinding or like shaving process only at the portions where dimensional accuracy (shape accuracy) is required, among forging formed articles. Accordingly, at the forging stage, the tip portion of the shaft portion is caused to overhang until at least a final finished shape is reached so that the cutting process at the tip portion is enabled, and the shaft member having high dimensional accuracy can be thus obtained.

Various shapes are possible as a final finished shape of the tip of the shaft portion. For example, a shape defined by the outer circumferential surface of the tip of the shaft portion, the tip face of the shaft portion and a chamfer between these two faces is possible.

According to the present invention, when the shaft member is in rotation, the pressure balance in the thrust bearing gap formed on both side of the flange portion in the axial direction can be restored in an early stage and the thrust bearing gaps can be always maintained at a predetermined interval. Therefore, the rotational performance of the bearing can be exerted stably for a long term. Moreover, such a function can be obtained at low costs, and mass productivity can be dramatically improved.

According to the present invention, the production of cutting powders associated with cutting is prevented. This prevents the deposition of contaminants to bearing component parts, disk crash, and contaminants from getting inside a bearing apparatus as much as possible, maintaining the cleanliness of the fluid lubrication bearing apparatus at low costs. Moreover, since the pin forming the prepared hole can be surely and accurately pushed into the shaft material, the cylindricity of the thread portion can be maintained highly accurately, and the mounting accuracy of other component screw fixed on the shaft member relative to the shaft member can be improved.

According to the present invention, a shaft member for fluid lubrication bearing apparatuses which has high dimensional accuracy and can be elongated can be provided at low costs.

DETAILED DESCRIPTION OF THE INVENTION

A first embodiment of the present invention will be described below with reference to FIGS. 1-10.

Figure 2:
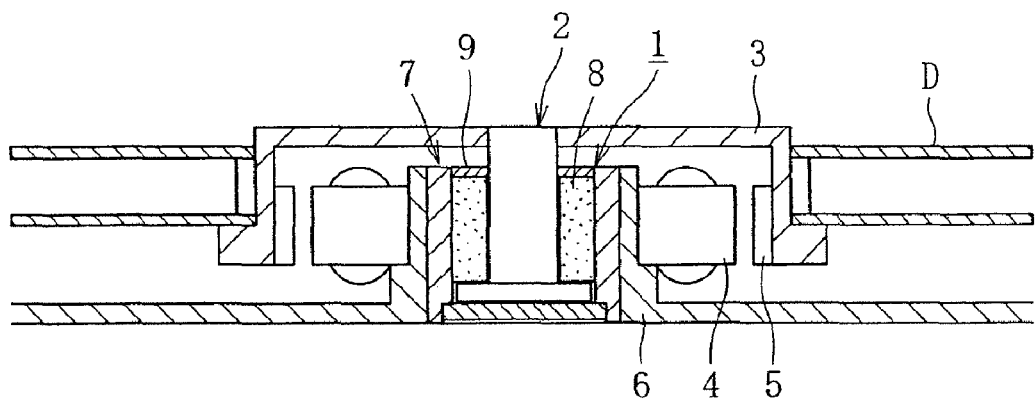
FIG. 2 is a cross-sectional view of a spindle motor for an information appliance integrating a hydrodynamic bearing apparatus comprising a shaft member.

FIG. 2 conceptionally shows an example of the constitution of a spindle motor for information appliances incorporating a hydrodynamic bearing apparatus 1 according to the first embodiment of the present invention. This spindle motor for an information appliance is used for disk drive units such as HDDs. It comprises the hydrodynamic bearing apparatus 1 which rotatably supports a shaft member 2 in a non-contact manner; a disk hub 3 which is mounted on the shaft member 2; for example, a stator coil 4 and a rotor magnet 5 facing each other across a gap in the radial direction; and a bracket 6. The stator coil 4 is mounted on the outer periphery of the bracket 6, and the rotor magnet 5 is mounted on the inner periphery of the disk hub 3. The bracket 6 has the hydrodynamic bearing apparatus 1 mounted on its inner periphery. Moreover, disk hub 3 retains one or more disk-shaped information recording media such as magnetic disks (hereinafter referred to simply as a disk) D on its outer periphery. In the thus constructed spindle motor for information appliances, when the stator coil 4 is energized, the rotor magnet 5 is rotated by the excitation between the stator coil 4 and rotor magnet 5. This causes the disk hub 3 and the disk D retained on the disk hub 3 to rotate unitarily with the shaft member 2.

Figure 3:
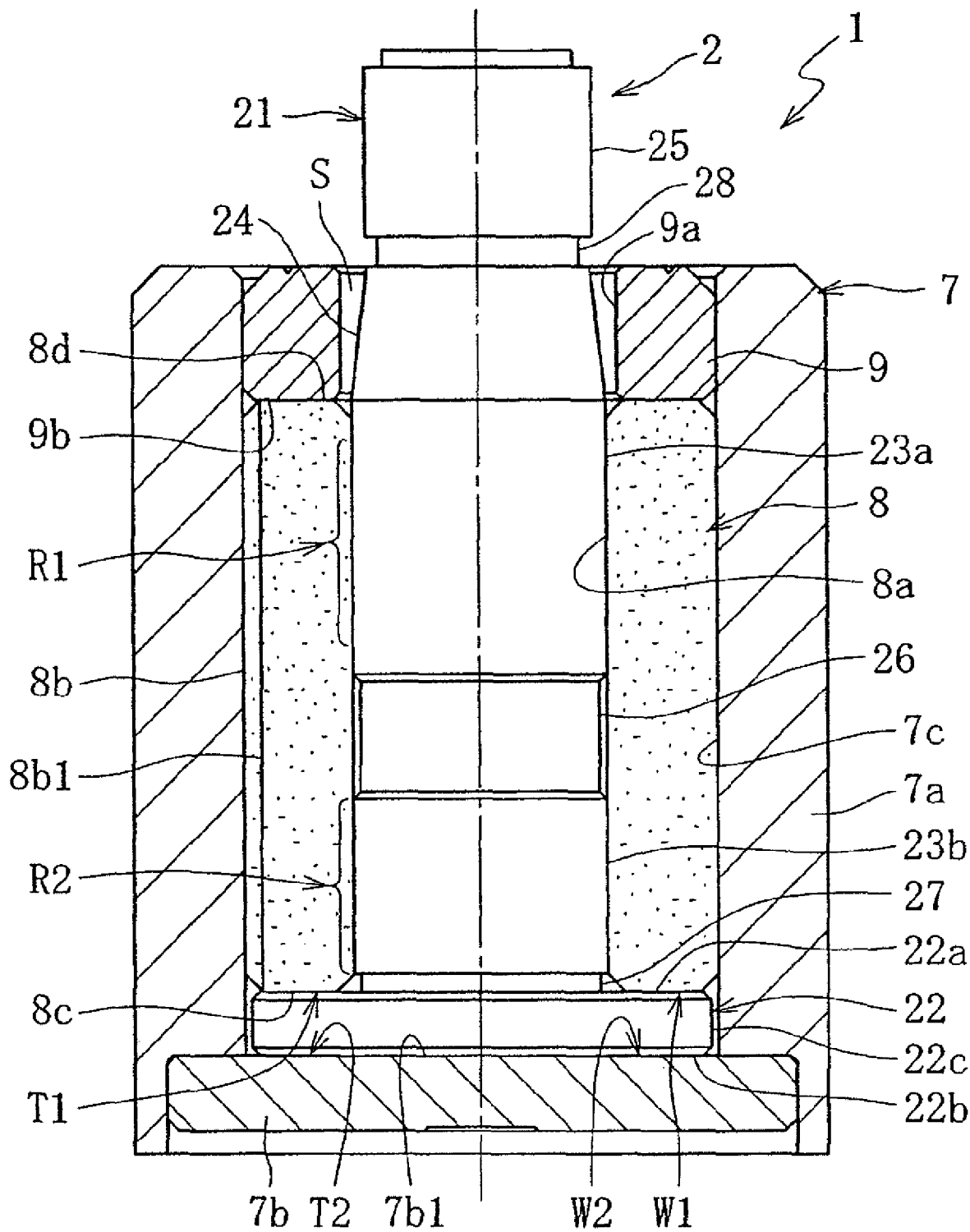
FIG. 3 is a longitudinal sectional view of a hydrodynamic bearing apparatus.

FIG. 3 shows an example of the hydrodynamic bearing apparatus 1. This hydrodynamic bearing apparatus 1 is constituted of a housing 7 having a bottom 7*b* at its one end; a bearing sleeve 8 fixed on to the housing 7; a shaft member 2 inserted into the inner periphery of the bearing sleeve 8; and a sealing member 9 as its main components. For the sake of explanation, the bottom 7*b* side of the housing 7 is referred to as the lower side, and the side opposite to the bottom 7*b* is referred to as the upper side in the following description.

As shown in FIG. 3, the housing 7 is constituted of, for example, a side portion 7*a* formed of a resin material such as LCP, PPS, or PEEK in the form of a cylinder, and a bottom 7*b* located at one end side of the side portion 7*a* and, for example, formed of a metallic material. In this embodiment, the bottom 7*b* is formed separately from the side portion 7*a* and is retrofitted on the lower inner periphery of the side portion 7*a*. In a part of the annular region of the upper end face 7*b*1 of the bottom 7*b*, for example, a region in which a plurality of hydrodynamic grooves are arranged spirally is formed as a portion for producing hydrodynamic pressure, although not shown in the Figs. Note that in this embodiment, the bottom 7*b* is formed separately from the side portion 7*a*, and fixed on the lower inner periphery of the side portion 7*a*. It can be, however, formed integrally with the side portion 7*a*, for example, from a resin material. At this time, the hydrodynamic grooves provided on the upper end face 7*b*1 can be die-formed simultaneously with the injection molding of the housing 7 comprising the side portion 7*a* and bottom 7*b*, which can dispense with the trouble of forming the hydrodynamic grooves on the bottom 7*b*.

The bearing sleeve 8 is formed, for example, of a porous body made of a sintered metal, especially a porous body of a sintered metal comprising copper as a main ingredient in the form of a cylinder, and is fixed at a predetermined position the inner periphery face 7*c* of the housing 7.

Figure 4:
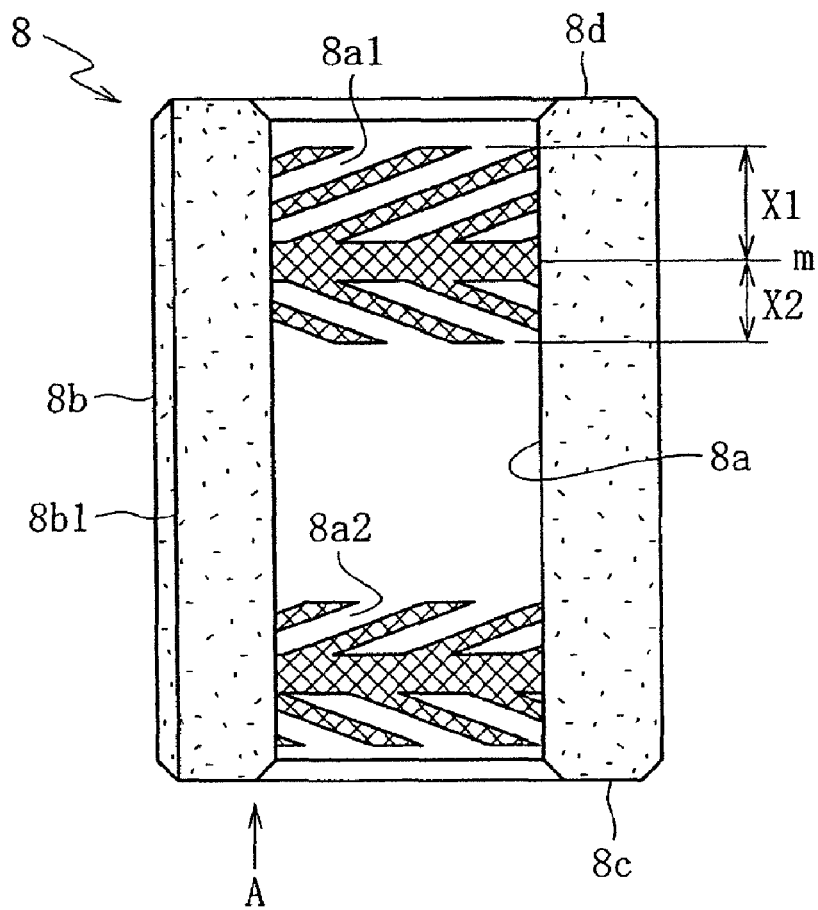
FIG. 4 is a longitudinal sectional view of a bearing sleeve.

Throughout the inner periphery face 8*a* of the bearing sleeve 8 or in part of its cylinder face region, a hydrodynamic pressure producing part is formed. In this embodiment, for example, as shown in FIG. 4, the region, in which a plurality of hydrodynamic grooves 8a1, 8a2 are arranged in a herringbone shape, is formed at two axially separated positions. In the region where of the upper hydrodynamic groove 8a1 is formed, the hydrodynamic groove 8a1 is formed asymmetrically in the axial direction relative to the axial center m (the axial center of the region between the upper and lower slanted grooves), the axial dimension X1 of the region above the axial center m is larger than the axial dimension X2 of the region therebelow. Therefore, when the shaft member 2 is in rotation, the lubricating oil in the radial bearing gap by the asymmetric hydrodynamic groove 8a1 is pushed downward.

On the outer circumferential surface 8b of the bearing sleeve 8, one or more axial direction grooves 8b1 are formed throughout its axial length. In this embodiment, three axial direction grooves 8b1 are formed at an equal interval in the circumferential direction.

Figure 5:
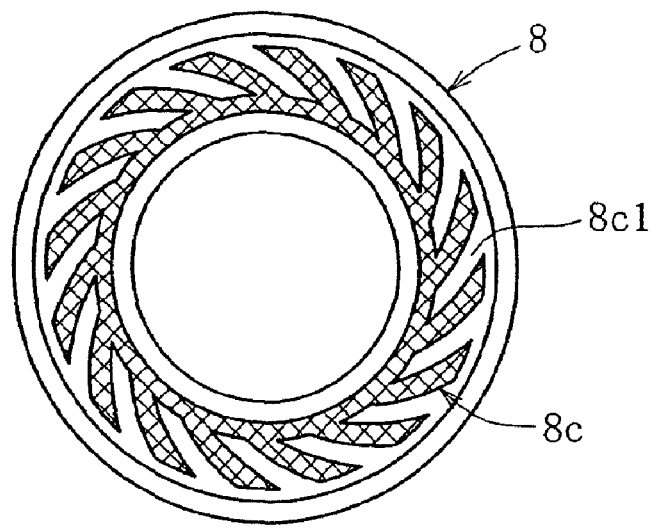
FIG. 5 is a lower end view of a bearing sleeve.

In the entire annular region of the lower end face 8C of the bearing sleeve 8 or apart thereof, a region in which a plurality of hydrodynamic grooves 8c1 are arranged in a spiral shape is formed as a portion for producing hydrodynamic pressure, for example, as shown in FIG. 5.

A sealing member 9 as a sealing means is formed, as shown in FIG. 3, for example, of a soft metallic material such as brass and other metallic materials, or a resin material separately from the housing 7 and in an annular shape, and fixed by means of press fitting, adhesion or the like into the upper inner periphery of the side portion 7a of the housing 7. In this embodiment, the inner periphery face 9a of the sealing member 9 is formed in the form of a cylinder, and the lower end face 9b of the sealing member 9 is in contact with the upper end face 8d of the bearing sleeve 8.

Figure 1:
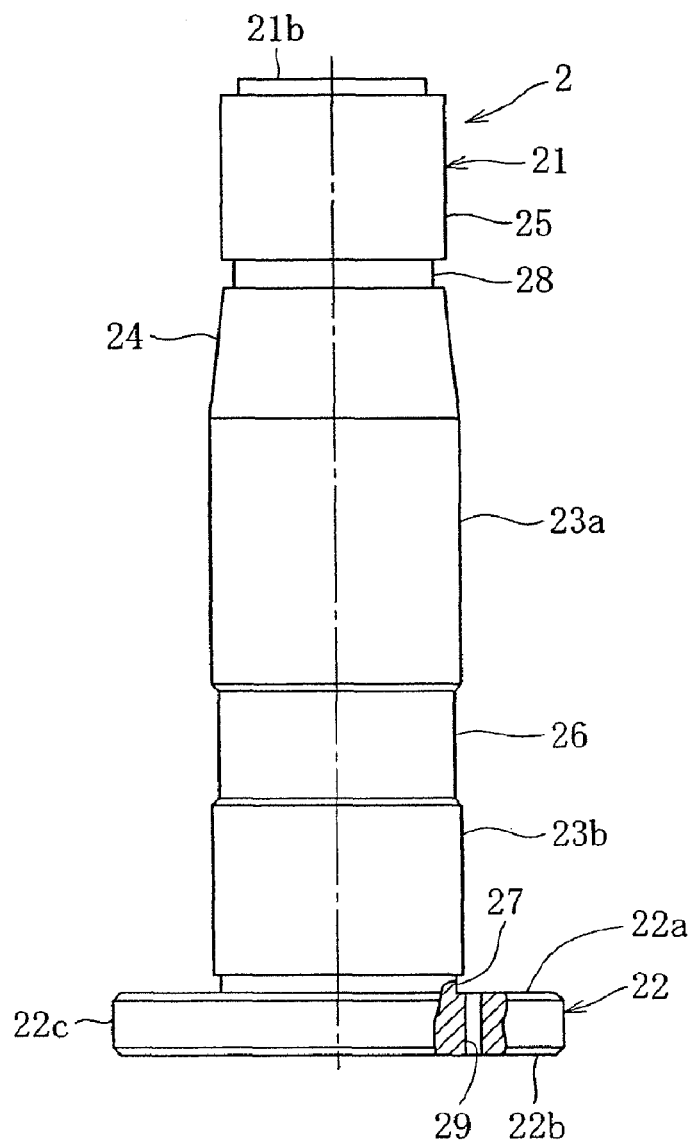
FIG. 1 is a side elevational view of a shaft member for hydrodynamic bearing apparatuses according to the first embodiment of the present invention.

The shaft member 2 is, for example, formed of a metallic material such as stainless steel, and has a T-shaped cross section integrally comprising a shaft portion 21 and a flange portion 22 provided at the lower end of the shaft portion 21, as shown in FIG. 1. At the outer periphery of the shaft portion 21, as shown in FIG. 3, radial bearing faces 23a, 23b facing the region in which two hydrodynamic grooves 8a1, 8a2 are formed on the inner periphery face 8a of the bearing sleeve 8 are formed at two axially separated positions. Above one of the radial bearing faces, the face 23a, a tapered face 24 whose diameter gradually decreases toward the shaft tip is formed adjacently. Further thereabove, a cylinder face 25, which serves as a mounting portion of the disk hub 3, is formed. Annular recess portions 26, 27, 28 are formed between the two radial bearing faces 23a, 23b, between the other radial bearing face 23b and flange portion 22, and between the tapered face 24 and cylinder face 25, respectively.

On the upper end face of the flange portion 22, for example, a thrust bearing face 22a of a first thrust bearing portion T1 facing the thrust bearing gap is formed, as shown in FIG. 3. On the lower end face of the flange portion 22, a thrust bearing face 22b of a second thrust bearing portion T2 facing thrust bearing gap is formed, as shown in FIG. 3. In addition, on the inner diameter side (in the vicinity of the shaft portion 21) of the flange portion 22, a through-hole 29 opening to both end faces of the flange portion 22 is formed. In this embodiment, the through-hole 29 opens to a portion on the inner diameter side of the thrust bearing faces 22a, 22b of both end faces of the flange portion 22.

Between the tapered face 24 of the shaft portion 21 and the inner periphery face 9a of the sealing member 9 facing the tapered face 24, an annular sealing space S, whose radial dimension is gradually increased upwardly from the bottom 7b side of the housing 7, is formed. In the hydrodynamic bearing apparatus 1 after being assembled (refer to FIG. 3), the inner space of the housing 7 containing the radial bearing gap and thrust bearing gap is completely filled with a lubricating oil, and its oil level is maintained to be within the range of the sealing space S.

In the thus constructed hydrodynamic bearing apparatus 1, when the shaft member 2 is rotated, the pressures of lubricating oil films formed in the radial bearing gap between the regions (upper and lower) where the hydrodynamic grooves 8a1, 8a2 of the inner periphery face 8a of the bearing sleeve are formed and the radial bearing faces 23a, 23b of the shaft portion 21 facing the region where these hydrodynamic grooves 8a1, 8a2 are formed, respectively, are increased by the hydrodynamic effect of the hydrodynamic grooves 8a1, 8a2. A first radial bearing portion R1 and a second radial bearing portion R2 which rotatably support the shaft member 2 in the radial direction in a non-contact manner by the pressure of these oil films are then formed. Moreover, the pressure of the lubricating oil films formed in a first thrust bearing gap W1 (refer to FIG. 3) and in a second thrust bearing gap W2 (refer to FIG. 3) is increased by the hydrodynamic effect of the hydrodynamic grooves. The first thrust bearing gap W1 is between a hydrodynamic groove 8c1 region formed on the lower end face 8C of the bearing sleeve 8 and the upper (the shaft portion side) thrust bearing face 22a of the flange portion 22 facing this hydrodynamic groove 8c1 region, while the second thrust bearing gap W2 is between the hydrodynamic groove region formed on the upper end face 7b1 of the bottom 7b and the thrust bearing face 22b on the lower side (opposite to the shaft portion side) of the flange portion 22 facing this hydrodynamic groove region. In addition, a first thrust bearing portion T1 and a second thrust bearing portion T2, which rotatably support the shaft member 2 in a non-contact manner in the thrust direction, are formed by the pressure of these oil films.

When the shaft member 2 is in rotation, the lubricating oil circulates in the above radial bearing gap W1 and thrust bearing gap W2, or between the above gaps and the inside of the bearing sleeve 8 made of a porous body, and the lubricating oil is appropriately provided for supporting the shaft member in the bearing gaps. However, for some reason, the circulation of the oil is sometimes disturbed. Also in that case, the through-hole 29 provided on the flange portion 22 adjusts the pressure balance between the thrust bearing gaps W1, W2, whereby one thrust bearing gap (first thrust bearing gap W1) and the other thrust bearing gap (second thrust bearing gap W2) can be maintained at appropriate intervals. Accordingly, the shaft member 2 can be stably supported in the thrust direction, enabling stable exertion of such bearing performance for a long term.

A method for producing the shaft member 2 constituting the hydrodynamic bearing apparatus 1 will be described below.

The shaft member 2 is produced mainly in the following two steps: a (A) forming step and a (B) grinding step. The (A) forming step in this procedure comprises a shaft material forming process (A-1); a through-hole forming process (A-2); and a shaft portion correcting process (A-3). Moreover, the (B) grinding step comprises a width grinding process (B-1); a full face grinding process (B-2); and a finish grinding process (B-3).

Figure 6:
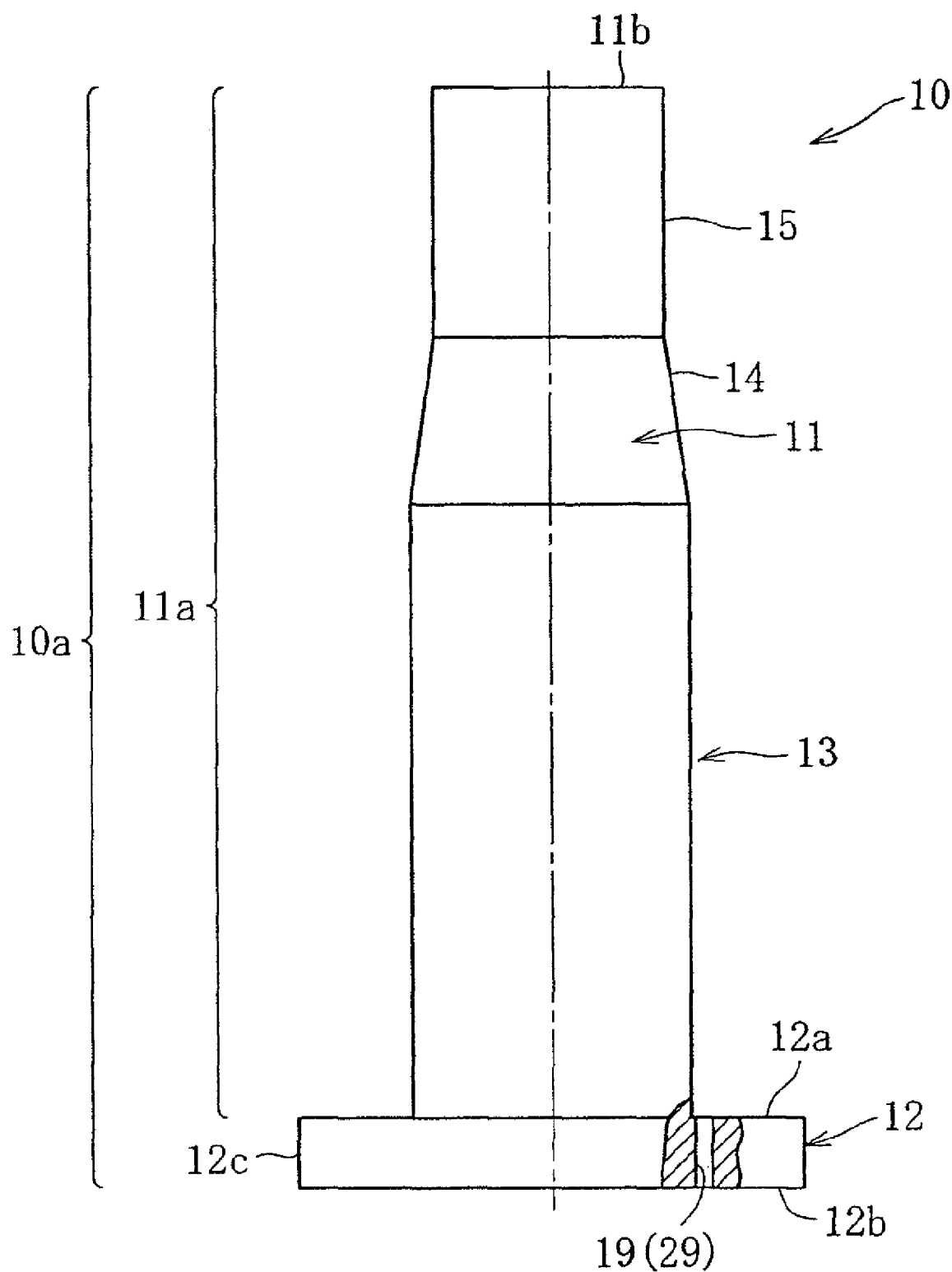
FIG. 6 is a side elevational view of a shaft material formed by a forging process.

(A) Forming Step (A-1) Shaft Material Forming Process and (A-2) Through-Hole Forming Process To begin with, a metallic material such as stainless steel which will be a material of the shaft member 2 to be formed is compression-formed (forging process) by using molds, for example, in a cold state so that, for example, the shaft material 10 integrally having the region corresponding to the shaft portion (hereinafter referred to simply as a shaft portion) 11 and the region corresponding to the flange portion (hereinafter referred to simply as a flange portion.) 12 is formed (shaft material forming process (A-1)) as shown in FIG. 6. In this embodiment, a mold used in forging of this shaft material 10 also serves as the mold for forming the through-hole 19 on the flange portion 12. Accordingly, by compression-forming the metal material with this mold, a through-hole 19 passing between the side end face 12a of the shaft portion of the flange portion 12 and the end face on the side opposite to the shaft portion 12b is formed (through-hole forming process (A-2)) on the inner diameter side (in the vicinity of the shaft portion 11) of the flange portion 12 as the shaft material 10 is formed by forging, as shown in FIG. 6.

As mentioned above, performing the forming of the through-hole 19 on the flange portion 12 by a forging process can prevent cutting powders and the like produced by processing, and dispense with or simplify a cleaning step after the process. Moreover, the forming of the through-hole 19 and the forming of the shaft material 10 integrally comprising the shaft portion 11 and flange portion 12 are performed both by forging and simultaneously, whereby such a processing step can be simplified, and machining time can be greatly shortened.

A method of cold-forging employed in the above forming step may be, extrusion, upsetting, heading or the like, or combinations of them. In the examples shown in FIG. 6, the outer circumferential surface 11a of the shaft portion 11 after being subjected to the forging process is in a different diameter shape comprising a tapered face 14 and a cylinder face 15 which is continuous upwardly with the tapered face 14 and has a smaller diameter than other portions disposed therebetween, but may be formed to have a uniform diameter throughout its length by dispensing with the tapered face 14. Note that in this embodiment, described is the case where the forming of the shaft material 10 and the forming of the through-hole 19 are performed both by a forging process simultaneously, both steps need not necessarily be performed simultaneously and the through-hole 19 may be formed by forging after forming the shaft material 10 by forging.

(A-3) Shaft Portion Correcting Process

The shaft portion 11 of the shaft material 10 formed by forging in the previous step is nipped with pressure, for example, with a pair of rolling die (for example, flat dies and round dies, etc.) and said pair of rolling dies are reciprocated in the directions opposite to each other to perform a rolling process for correcting cylindricity on the outer circumferential surface 11a of the shaft portion 11 (shaft portion correcting process (A-3)), although not shown in the Figs. This improves the cylindricity of the face 13 subjected to the correcting process, of the outer circumferential surface 11a of the shaft portion of the shaft material 10 so that it falls within a required range (for example, 10 μm or lower). Examples of the correcting processes of the cylindricity employed include a rolling process, drawing compound, ironing, sizing by pressing split-cavity molds (nipping) and various other processing methods. Moreover, the correcting process is performed not only throughout the length of the outer circumferential surface 11a of the shaft portion 11, but also on apart of the outer circumferential surface 11a, as long as it includes the portions corresponding to the radial bearing faces 23a, 23b of the shaft member 2 as a finished product.

(B) Grinding Step
(B-1) Width Grinding Process

The end face 11b of the shaft portion and end face 12b of the flange portion 12 on the opposite side of the shaft portion, which will be the end faces of the shaft material 10 after being subjected to the forming step, are ground relative to the corrected face 13 mentioned above. A grinding apparatus 40 used in this grinding step comprises, for example, a carrier 41 which retains a plurality of the shaft material 10 as workpiece; and a pair of grind stones 42, 42 which grinds the end face 11b of the shaft portion and end face 12b of the flange portion 12 on the opposite side of the shaft portion of the shaft material 10 retained by the carrier 41, as shown in FIG. 7.

Figure 7:
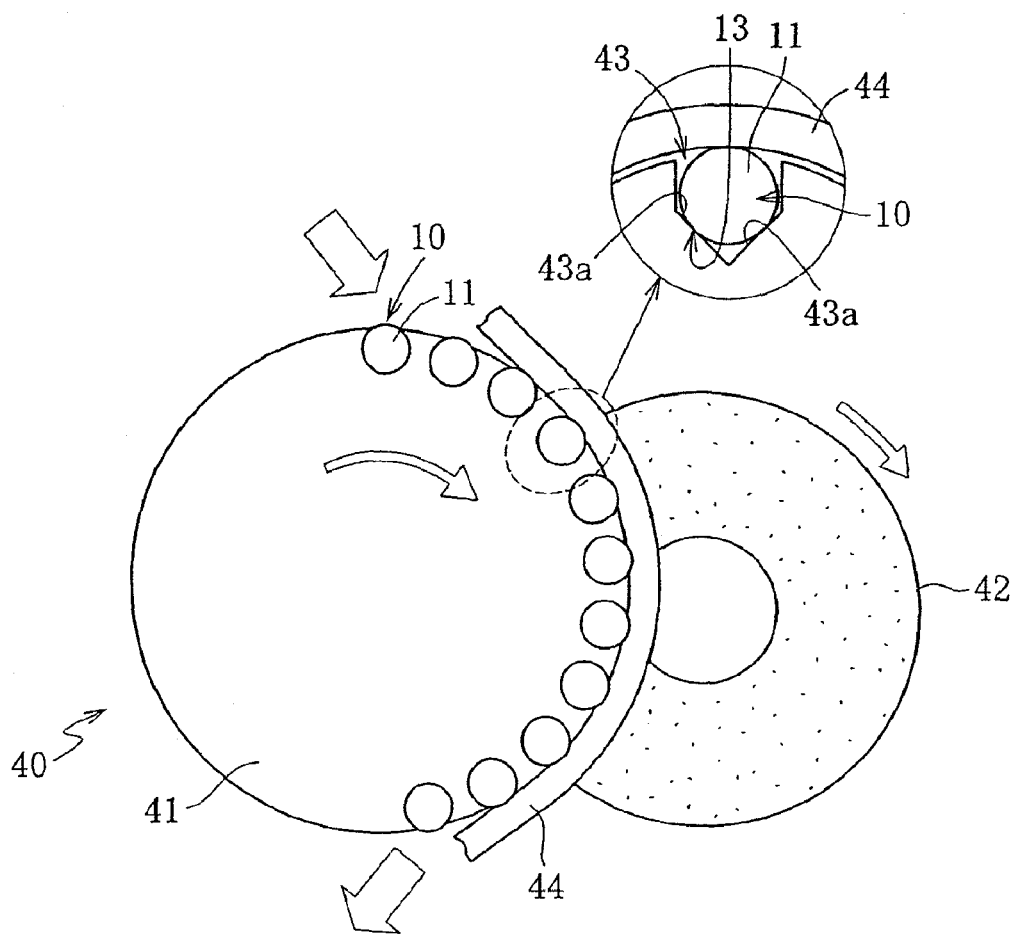
FIG. 7 is a schematic illustration showing an example a grinding apparatus according to the width grinding step of a shaft material.
Figure 8:
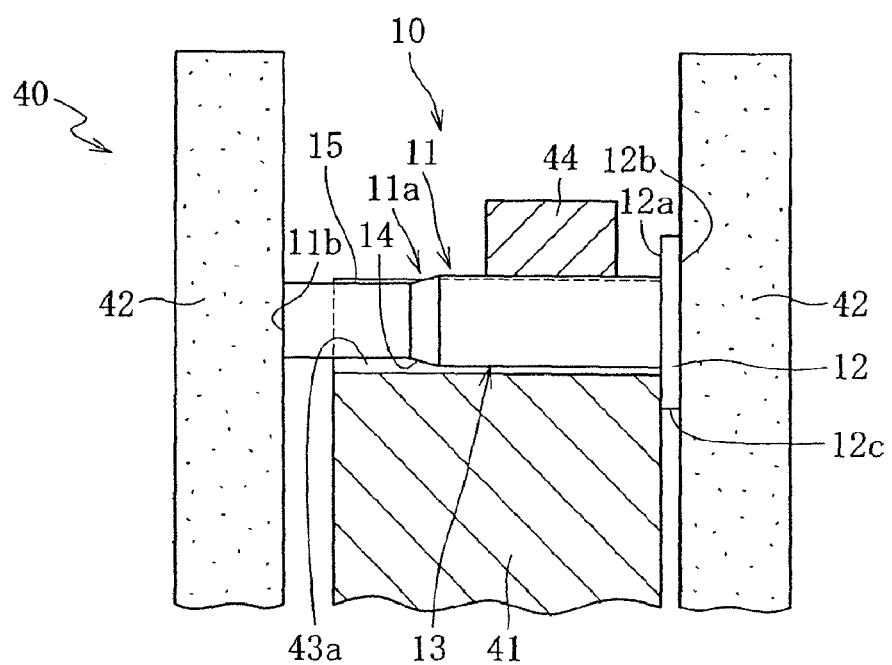
FIG. 8 is a partial cross-sectional view showing an example of a grinding apparatus according to the width grinding step.

As shown in FIG. 7, a plurality of notches 43 is provided on part of the circumferential region of the outer periphery of the carrier 41 at an equal pitch in the circumferential direction. The shaft material 10 is contained in the notch 43 with its correcting process face 13 in angular contact with the inner face 43a of the notch 43. The correcting process face 13 of the shaft material 10 protrudes slightly from the outer circumferential surface of the carrier 41, and a belt 44 is provided on the outer diameter side of the carrier in a tensioned state to bind the protruding portions of the shaft material 10 from the outer diameter side. On both axial end sides of the carrier 41 where the shaft material 10 is contained in the notch 43, for example, a pair of grind stones 42, 42 are coaxially disposed with their end faces (grinding surfaces) facing each other at a predetermined interval, as shown in FIG. 8.

As the carrier 41 rotates, the shaft material 10 is sequentially loaded into the notch 43 from a determined position. The loaded shaft material 10 traverses the end faces of the rotating grind stones 42, 42 from their outer diameter edge toward the inner diameter edge in such a state that it is prevented from falling off from the notch 43 by binding of the belt 44. Accordingly, both end faces of the shaft material 10, i.e., the end face 11b of the shaft portion and the end face 12b of the flange portion 12 on the side opposite to the shaft portion are ground by the end faces of the grind stones 42, 42 (refer to FIG. 8). At this time, the corrected face 13 of the shaft material 10 is supported by the carrier 41 and this corrected face 13 has high cylindricity. Therefore, if the perpendicularity of the rotation axis of the grind stone 42 and the grinding surface of the grind stone 42 and the parallelism of the rotation axis of the grind stone 42 and the rotation axis of the carrier 41, etc. are highly accurately controlled in advance, both end faces 11b, 12b of the shaft material 10 can be highly accurately finished with reference to this corrected face 13, enabling to suppress the value of the perpendicularity relative to the corrected face 13. Moreover, the width of the shaft material 10 in the axial direction (the overall length including the flange portion 12) can be finished to have a predetermined size.

(B-2) Full Face Grinding Process

Figure 9:
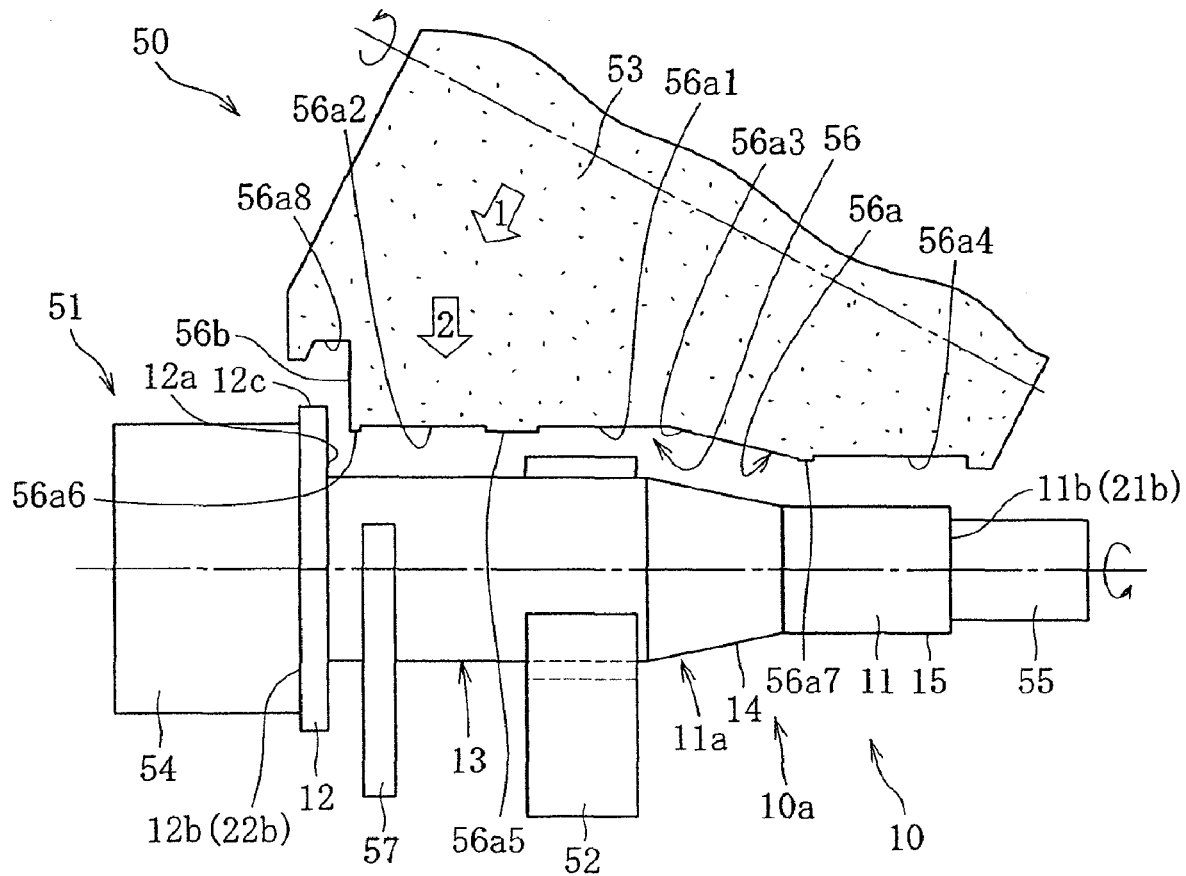
FIG. 9 is a schematic illustration showing an example of a grinding apparatus according to the full face grinding process step of a shaft material.
Figure 10:
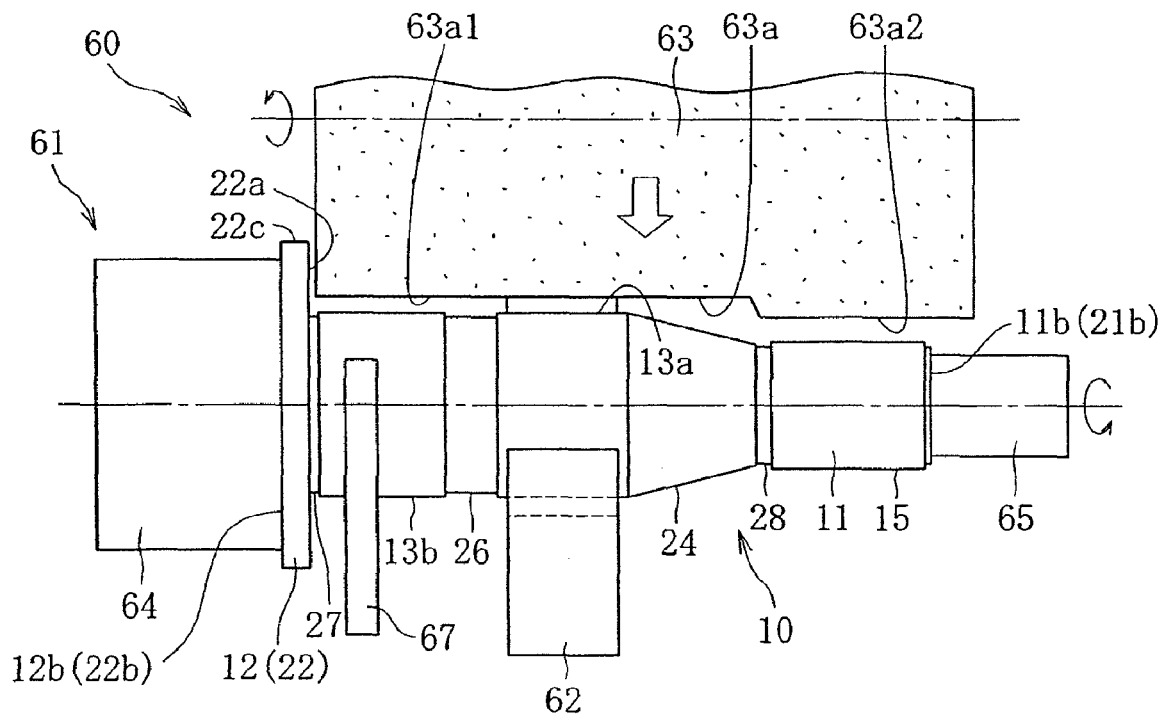
FIG. 10 is a schematic illustration showing an example of a grinding apparatus according to the grinding finish step of a shaft material.

Subsequently, the outer circumferential surface 10a of the shaft material 10 and the side end face 12a of the flange portion 12 on the shaft portion side are ground relative to both end faces (the end face 11b of the shaft portion, the end face 12b of the flange portion 12 on the side opposite to the shaft portion) of the ground shaft material 10. The grinding apparatus 50 used in this grinding step performs, for example, plunge-grinding by the grind stone 53 with the back plate 54 and pressure plate 55 pressed to both end faces of the shaft material 10, as shown in FIG. 9. The corrected face 13 of the shaft material 10 is rotatably supported by a shoe 52.

The grind stone 53 is a formed grind stone which comprises a grinding surface 56 corresponding to the outer circumferential surface shape of the shaft member 2 as a finished product. The grinding surface 56 comprises a cylinder grinding portion 56a which grinds the outer circumferential surface 11a through the length of the shaft portion 11 in the axial direction and the outer circumferential surface 12c of the flange portion 12; and a plane grinding portion 56b which grinds the side end face 12a of the shaft portion of the flange portion 12. The grind stone 53 in the example shown in FIG. 9 comprises, as the cylinder grinding portion 56a, portions 56a1, 56a2, which grind the regions corresponding to the radial bearing faces 23a, 23b of the shaft member 2, a portion 56a3, which grinds the region corresponding to the tapered face 24, a portion 56a4, which grinds the region corresponding to the cylinder face 25, portions 56a5-56a7, which grind the recess portions 26-28, respectively, and a portion 56a8, which grinds a region corresponding to the outer circumferential surface 22c of the flange portion 22.

Grinding in the grinding apparatus 50 of the above constitution is performed in the following procedure. To begin with, the grind stone 53 is fed obliquely (the direction of arrow 1 in FIG. 9) with the shaft material 10 and grind stone 53 rotating, and a plane grinding portion 56b of grind stone 53 is pressed against the side end face 12a on the shaft portion side of the flange portion 12 to grind the side end face 12a on the shaft portion side of the flange portion 12. The finishing process of the end face of the flange portion 22 of the shaft member 2 on the shaft portion side is thus completed, forming the thrust bearing face 22a facing a first thrust bearing portion T1. Subsequently, the grind stone 53 is fed in the direction perpendicular to the rotation axis of the shaft material 10 (the direction of arrow 2 in FIG. 9), and the cylinder grinding portion 56a of the grind stone 53 is pressed to the outer circumferential surface 11a of the shaft portion 11 of the shaft material 10 and the outer circumferential surface 12c of the flange portion 12 to grind the faces 11a, 12c. Accordingly, out of the outer circumferential surface of the shaft portion 21 of the shaft member 2, the regions corresponding to radial bearing faces 23a, 23b and cylinder face 25 are ground respectively, and the tapered face 24, the outer circumferential surface 22c of the flange portion 22, and the recess portions 26-28 are formed. Note that in the above grinding, for example, it is preferred to perform grinding while measuring the remaining grinding allowance by a measurement gauge 57, as shown in FIG. 9.

In this full face grinding process step, since the accuracy setting of the perpendicularity of both end faces 11b, 12b of the shaft material 10 has been performed beforehand in the width grinding, each of the to-be-ground surfaces can be ground highly accurately.

(B-3) Finish Grinding Process (B-2) Among the faces which have been ground in full face grinding process, the radial bearing faces 23a, 23b of the shaft member 2 and the region corresponding to the cylinder face 25 are subjected to the final finish grinding process. An example of the grinding apparatus used in this grinding is a cylinder grinder shown in FIG. 10. It performs plunge grinding by the grind stone 63, while rotating the shaft material 10 held between the back plate 64 and pressure plate 65. The shaft material 10 is rotatably supported by a shoe 62. A grinding surface 63a of the grind stone 63 comprises a first cylinder grinding portion 63a1 which grinds regions corresponding to the radial bearing faces 23a, 23b of the shaft member 2 (the regions 13a, 13b in FIG. 10), and a second cylinder grinding portion 63a2 which grinds a region corresponding to the cylinder face 25 (region 15 in FIG. 10).

In the grinding apparatus 60 having the above constitution, by providing the rotating grind stone 63 with the feed in the radial direction, the regions 13a, 13b, and 15 corresponding to the radial bearing faces 23a, 23b and cylinder face 25, respectively, are ground, and these regions are finished to have the final surface accuracy.

After the above (A) forming step and (B) grinding step are finished, heat treatment and cleaning process, if necessary, can be performed to complete the shaft member 2 shown in FIG. 1. Accordingly, in the vicinity of the shaft portion 21, a through-hole 29 opening to both end faces of the flange portion 22 is formed. Since the inner periphery face of the through-hole 29 is formed by a forging process, its surface roughness becomes high.

According to the above production method, the cylindricity of the radial bearing faces 23a, 23b formed on the outer periphery of the shaft portion 21 can be finished highly accurately. Because of this, for example, the circumferential or axial variation of the radial bearing gap formed between the inner periphery face 8a of the inner periphery of the bearing sleeve 8 of in the hydrodynamic bearing apparatus 1 and itself is suppressed to be in a predetermined range, and bearing performance can be thus prevented from being adversely affected by the variation of the above radial bearing gap. Moreover, relative to the radial bearing faces 23a, 23b formed on the outer periphery of the shaft portion 21, the shaft member 2 whose values of the perpendicularity of both end faces 22a, 22b of the flange portion 22 (thrust bearing face) are suppressed can also be formed. Because the thrust bearing faces 22a, 22b formed on both end faces of the flange portion 22 form the thrust bearing gap between themselves and the faces facing them (the lower end face 8C of the bearing sleeve 8, the upper end face 7b1 of the bottom 7b of the housing 7, etc.), the numerical value of such perpendicularity can be thus suppressed to a low level, whereby variation in the above thrust bearing gap can be reduced. Moreover, the end face of the shaft portion 21b can also serve as the reference plane for setting the above thrust bearing gap. Accordingly, by suppressing the numerical value of the perpendicularity of the end face 21b of the shaft portion to a low level, the thrust bearing gap can be controlled with high accuracy.

Moreover, in this embodiment, since a finish grinding process (refer to FIG. 10) is performed in the region corresponding to the cylinder face 25 of the shaft portion 21, the cylindricity of the cylinder face 25 can also be finished highly accurately, the mounting accuracy in mounting components such as the disk hub 3 to the shaft member 2 can be increased. Because of this, the accuracy when clampers or the like for retaining the disk D on the disk hub 3 is fixed on the shaft member 2 can be increased, and the mounting accuracy relative to the shaft member 2 of the disk D clamped between the clamper and disk hub 3 can be further increased, thereby further improving the motor performance.

Described in the above embodiment is the case where the through-hole 29 is formed so that it opens to the inner diameter side of these bearing face 22a, 22b to prevent a drop in the pressure in the thrust bearing gaps W1, W2, avoiding the thrust bearing faces 22a, 22b of the flange portion 22 (thrust bearing gaps W1, W2). However, when the hydrodynamic grooves and thrust bearing gaps can be set considering some pressure drop, the through-hole 29 can also be formed in such positions on the thrust bearing faces 22a, 22b.

A second embodiment of the present invention will be described below with reference to FIGS. 11-16. Note that portions and components having the same constitution and actions as the constitutions shown in FIGS. 1-10 (first embodiment) are referred to by the same reference numerals, and their repeated explanations are omitted.

Figure 13:
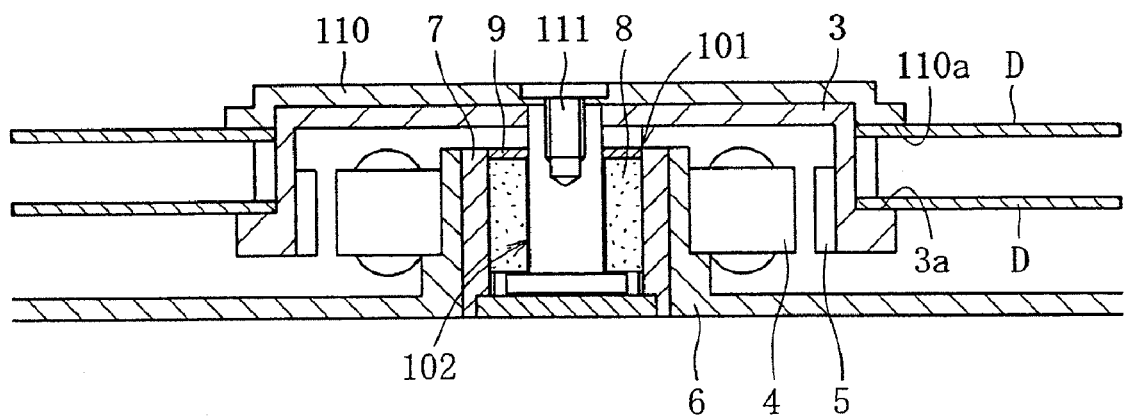
FIG. 13 is a cross-sectional view of a spindle motor for information appliances integrating a fluid lubrication bearing apparatus comprising a shaft member.

FIG. 13 conceptionally shows an example of the constitution of a spindle motor for information appliances incorporating a fluid lubrication bearing apparatus (hydrodynamic bearing apparatus) 101 according to the second embodiment of the present invention. This spindle motor for information appliances is used for disk drive units such as HDDs, and comprises a fluid lubrication bearing apparatus 101 which rotatably supports a shaft member 102 in a non-contact manner; a disk hub 3 mounted on the shaft member 102, a stator coil 4 and a rotor magnet 5 which, for example, face each other across a gap in the radial direction; and a bracket 6. The stator coil 4 is mounted on the outer periphery of the bracket 6, and the rotor magnet 5 is mounted on the inner periphery of the disk hub 3. The bracket 6 has a fluid lubrication bearing apparatus 101 attached on its inner periphery. Moreover, the disk hub 3 retains one or more disk D such as magnetic disks on its outer periphery, and the disk D is held between the disk hub 3 and a clamper 110. In this spindle motor for an information appliance, when the stator coil 4 is energized, the rotor magnet 5 is rotated by the magnetic force between the stator coil 4 and rotor magnet 5, whereby the disk hub 3, shaft member 102 and the disk D held between the disk hub 3 and clamper 110 are rotated unitarily.

Figure 14:
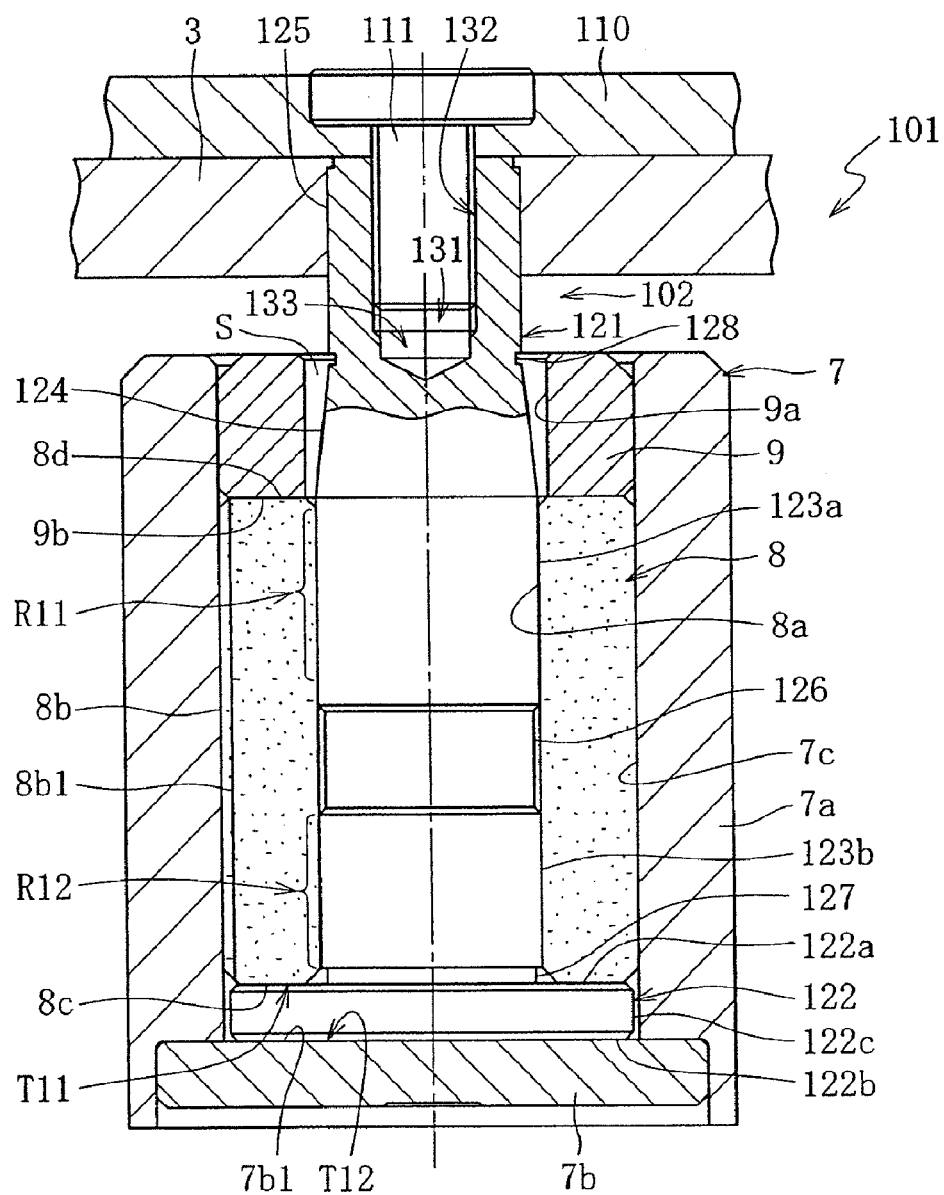
FIG. 14 is a longitudinal sectional view of a fluid lubrication bearing apparatus.

FIG. 14 shows an example of the fluid lubrication bearing apparatus 101. This fluid lubrication bearing apparatus 101 is constituted of a housing 7 having a bottom 7b at its one end; a bearing sleeve 8 fixed on the housing 7 as a sleeve member; a shaft member 102 inserted into the inner periphery of the bearing sleeve 8; and a sealing member 9, as its main components. For the sake of explanation, the bottom 7b side of the housing 7 is referred to as the lower side, and the side opposite to the bottom 7b is referred to as the upper side in the following description.

Figure 11:
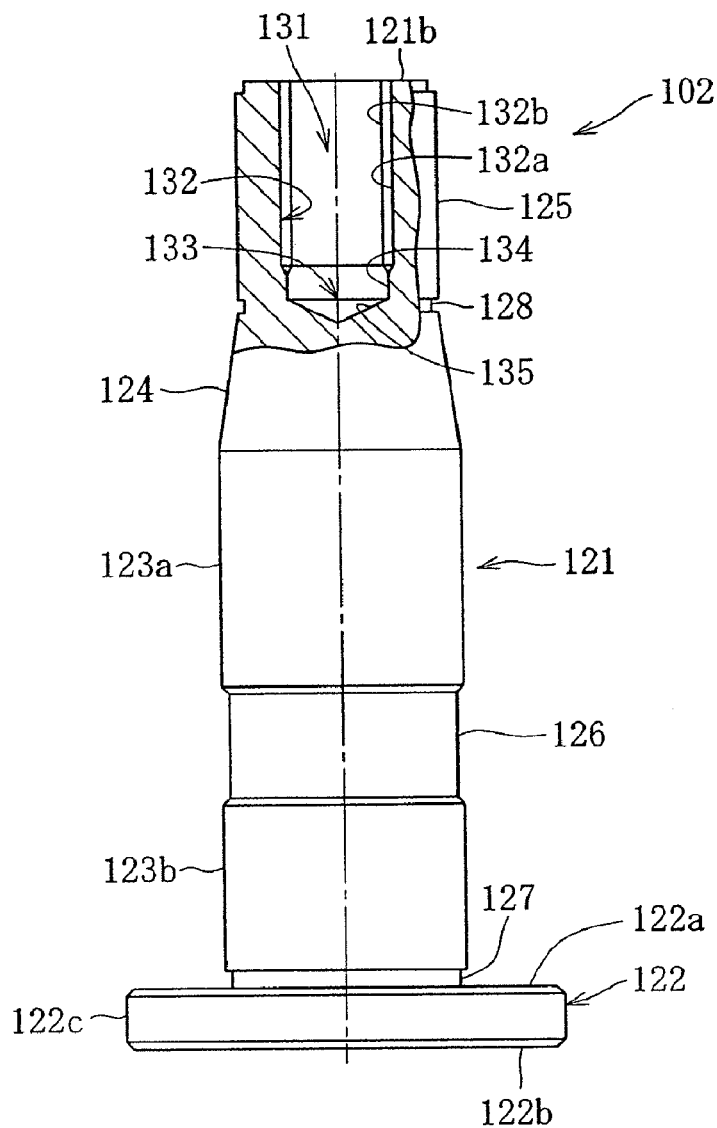
FIG. 11 is a side elevational view of a shaft member for fluid lubrication bearing apparatuses according to the second embodiment of the present invention.

The shaft member 102 is formed, for example, of a metallic material such as stainless steel, and has a T-shaped cross section integrally comprising a shaft portion 121 and a flange portion 122 provided at the lower end of the shaft portion 121, as shown in FIG. 11. On the outer periphery of the shaft portion 121, as in the first embodiment, radial bearing faces 123a, 123b facing the region in which two hydrodynamic grooves 8a1, 8a2 are formed on the inner periphery face 8a of the bearing sleeve 8 are formed at two axially separated positions, as shown in FIG. 4. Above one them, the radial bearing face 123a, a tapered face 124, of which diameter gradually decreases toward the shaft tip, is formed adjacently, and a cylinder face 125, which serves as a mounting portion of the disk hub 3, is formed further thereabove. Annular recess portions 126, 127, 128 are formed between the two radial bearing faces 123a, 123b, between the other radial bearing face 123b and flange portion 122, and between the tapered face 124 and the cylinder face 125, respectively.

Figure 12:
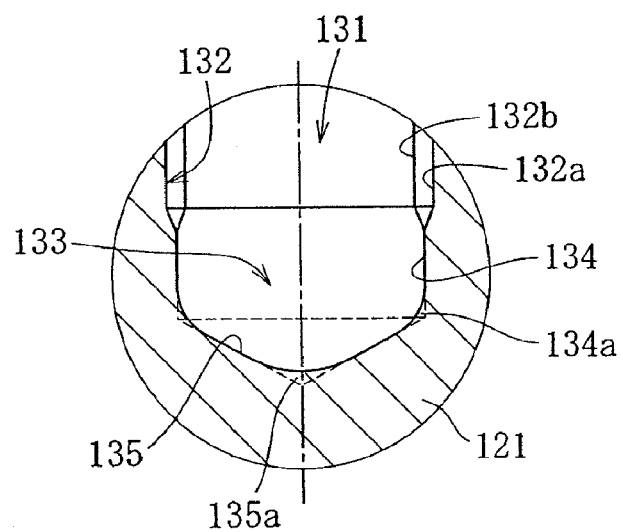
FIG. 12 is an expanded sectional view of the vicinity of the bottom of a threaded hole formed on the end of a shaft member.

In the shaft portion 121, on the axis of the end face 121b on the side opposite to the flange portion 122, a threaded hole 131 for screwing the clamper 110 on the shaft member 2 is formed. A thread portion 132 which screws together with screw 111 for fixing the clamper 110 on the inner periphery on the opening side of the hole 131 is formed, and for example, a prepared hole 133 formed prior to the formation of the thread portion 132 at the bottom of the threaded hole 131 as shown in FIG. 12 is remaining.

The disk hub 3 is fixed on the cylinder face 125 formed on the upper end of the shaft portion 121 of the above shaft member 102 by, for example, adhesion, press fitting or other means. In addition, the screw 111 is screwed into the threaded hole 131 formed on the shaft portion 121 via the clamper 110 so that the clamper 110 is fixed on the disk hub 3, and the disk is held between the clamping faces 3a, 110a formed on the outer diameter side the upper face of the disk hub 3 and on the outer diameter side of the lower surface of the clamper 110.

In such a manner mentioned above, the fluid lubrication bearing apparatus 101 retaining the disk D on the disk hub 3 is constituted as shown in FIG. 14. At this time, an annular sealing space S, whose size in the radial direction is gradually increased upwardly from the bottom 7b side of the housing 7, is formed between the tapered face 124 of the shaft portion 121 and the inner periphery face 9a of a sealing member 9 facing the tapered face 124. In the fluid lubrication bearing apparatus 101 after being assembled (refer to FIG. 14), the oil level is retained within the range of the sealing space S.

In the thus constructed fluid lubrication bearing apparatus 101, when the shaft member 102 is rotated, the pressures of lubricating oil films formed in the radial bearing gaps between the radial bearing faces 123a, 123b of the shaft portion 121 facing the regions (upper and lower) where the hydrodynamic grooves 8a1, 8a2 are formed on the inner periphery of the bearing sleeve face 8a and the region where these hydrodynamic grooves 8a1, 8a2 are formed, respectively, are increased by the hydrodynamic effect of the hydrodynamic grooves 8a1, 8a2. In addition, a first radial bearing portion R11 and a second radial bearing portion R12 which rotatably support the shaft member 102 in the radial direction in a non-contact manner are formed by the pressure of these oil films. Moreover, the pressures of lubricating oil films formed in a first thrust bearing gap between the thrust bearing face 122a of the upper side (the shaft portion side) of the flange portion 122 facing the region where the hydrodynamic groove 8c1 is formed on the lower end face 8c of the bearing sleeve 8 and the region where this hydrodynamic groove 8c1 is formed, and in a second thrust bearing gap between the region where the hydrodynamic groove is formed on the upper end face 7b1 of the bottom 7b, the thrust bearing face 122b on the lower side (opposite to the shaft portion side) the flange portion 122 facing this face are increased by the hydrodynamic effect of the hydrodynamic grooves. In addition, a first thrust bearing portion T11 and a second thrust bearing portion T12 which rotatably support the shaft member 102 in the thrust direction in a non-contact manner are formed by the pressure of these oil films.

The production method of the shaft member 102 constituting the above fluid lubrication bearing apparatus 101 will be described below.

The shaft member 102 is produced in mainly two steps: a (C) forming step and a (D) grinding step. In this procedure, the (C) forming step comprises a forging process (C-1), a thread portion rolling process (C-2) and a correcting process (C-3). The (D) grinding step comprises a width grinding (D-1), a full face grinding process (D-2), and a finish grinding process (D-3).

(C) Forming Step
(C-1) Forging Process

Figure 15:
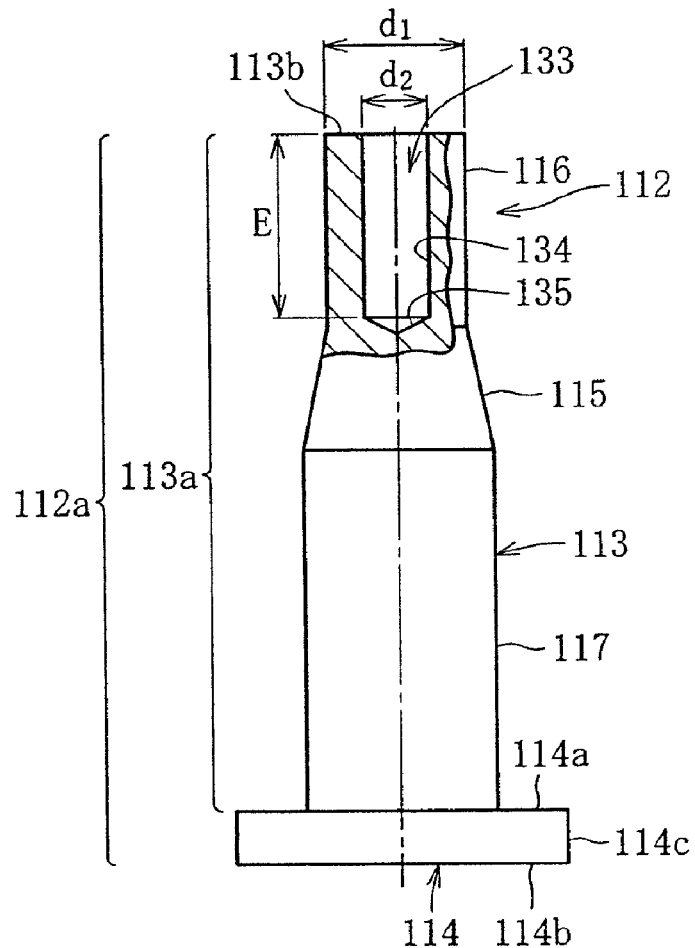
FIG. 15 is a side elevational view of a shaft material formed by a forging process.

To begin with, a material of the shaft member 102 to be formed, i.e., a metal material such as stainless steel is subjected to compression-forming (plastic deformation) with a mold, for example, in a cold state, whereby, for example, the shaft material 112 integrally having the region corresponding to the shaft portion (hereinafter referred to simply as a shaft portion) 113 and the region corresponding to the flange portion (hereinafter referred to simply as a flange portion.) 114 is formed (forging process), as shown in FIG. 15. Moreover, the prepared hole 133 for forming the threaded hole 131 is formed by forging (for example, backward extrusion) on the edge of the shaft portion 113 as the shaft material 112 is formed by the forging process mentioned above (refer to FIG. 11).

Figure 16:
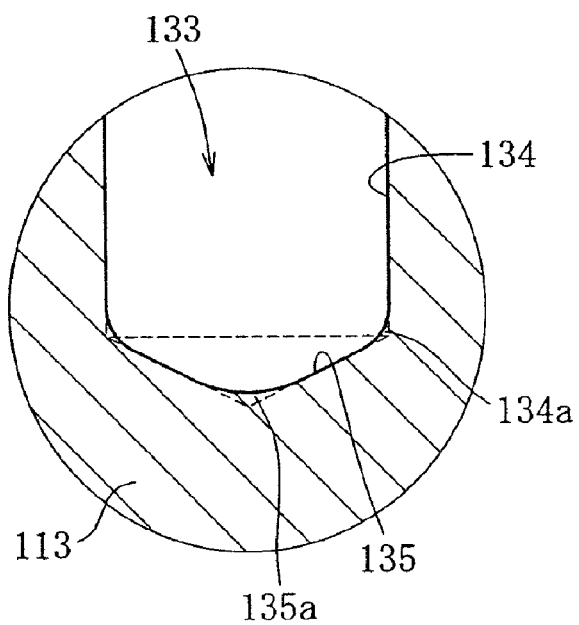
FIG. 16 is an expanded sectional view of the vicinity of the bottom of a prepared hole of a threaded hole formed the end of a shaft material.

At this time, on the inner periphery of the prepared hole 133 formed by forging simultaneously with the shaft material 112, a cylinder face 134 whose diameter is constant is formed as shown in FIG. 15, and a conical surface 135 which is continuous with the cylinder face 134 is formed at its bottom. In a connecting portion 134a between the conical surface 135 and cylinder face 134, a radially curved surface which smoothly connects the conical surface 135 and cylinder face 134 as shown in FIG. 16 is formed. Moreover, at a top 135a of the conical surface 135, a radially curved surface is formed similarly. From a different perspective, these are plastically deformed in conformity with the tip shape of the pin pushed into the metallic material in forging of the prepared hole 133. That is, although not shown in the Figs., a conical surface is formed at the tip of the pin, and a cylinder face is formed on the outer periphery of the pin, the connecting portion between the conical surface and the outer circumferential surface of the cylinder and the top of the conical surface has the shape of a rounded edge (both have a radially curved surface shape herein).

Such a pin shape (in this embodiment, the connecting portion between the conical surface and cylinder face of the pin and the top of the conical surface are each caused to be a radially curved surface), when the pin is pushed into the metallic material, concentrated stress at a portion corresponding to the connecting portion 134a of the metallic material (shaft material 112) or a portion corresponding to top 135a is mitigated. This can increase the yield rate in forming of the prepared hole 133 (in the forging process), and ensure the forming of the prepared hole 133. Moreover, for example, a radially curved surface is formed at the connecting portion 134a or top 135a, the diameter of the radially curved surface can be large enough to maintain the guide function of the pin of the conical surface 135 when the pin is pushed in. Because of this, the stress at a portion corresponding to the connecting portion 134a or a portion corresponding to the top 135a when the pin is pushed in can be mitigated, while the guide function of the conical surface formed at the tip of the pin when it is pushed into the processed material regarding the pushing direction is provided, enabling secure and accurate forming of the prepared hole 133.

As mentioned above, when the prepared hole is formed by forging, its reduction of area should be also noted. Reduction of area refers to the ratio of a cross section area of a material after being processed to that of the material before being processed. As in this embodiment, when the prepared hole 133 is formed by forging (mainly extrusion) on the bar metallic material (shaft material 112), assuming that the edge outer diameter of the shaft portion 113 in the shaft material 112 is d1 and the hole diameter of the prepared hole 133 formed by forging is d2, reduction in excess RA is, for example, represented by RA=$(\pi d2^2/4)/(\pi d1^2/4)\times 100[\%]$, as shown in FIG. 15.

Since the forging basically performs compression forming of the material which will be the target to be processed, required processing pressure, or processable processing pressure is affected by the ductility and strength of the processed material, and durability (wear resistance, strength, etc.) of the mold. Therefore, to obtain sufficient dimensional accuracy while ensuring moldability under this condition, a dimensional limit of processing inevitably occurs. From these perspectives, for example, when a steel material such as stainless steel is used as a raw material of the processed material (shaft material 112), the reduction in excess RA is preferably within the range of 20%-75%. The upper limit of this is preferably 70%, while the lower limit value is more preferably 25%. Moreover, there is also an appropriate range of the axial length of the prepared hole 133 formed for the reason mentioned above. For example, the dimension of the prepared hole 133 (aspect ratio) is preferably set so that the axial length (depth) E falls within the range of 2.0×d2–3.0×d2 at its maximum.

Moreover, in the forging process of the shaft material 112, depending on the shape of the shaft material 112 and the manner that it is formed, compressive force is not sufficiently transmitted to the tip portion of the shaft material 112, deformation may be insufficient at the tip portion. In contrast, in this embodiment, the prepared hole 133 of the threaded hole 131 is formed by forging at the tip portion of the shaft portion 113 simultaneously with forging of the shaft material 112, the material which was previously in the prepared hole 133 is pushed out to the surrounding of the prepared hole 133 to cause the tip portion to overhang on the outer diameter side and shaft end side. Accordingly, the tip portion can be formed preventing deformation shortage at the tip portion of the shaft material 112 as much as possible in forging.

Note that a method of cold forging employed in the above forming step may be the extrusion mentioned above (forward extrusion and backward extrusion), upsetting, heading or the like, or combinations of them. In the examples shown in FIG. 15, the outer circumferential surface 113a of the shaft portion 113 after the forging process is in a different diameter shape which comprises a tapered face 115 and a cylinder face 15 continuous upwardly with the tapered face 115 and having a diameter than other portions disposed therebetween, but the tapered face 115 may be dispensed with and formed to have a uniform diameter throughout its length.

(C-2) Thread Portion Rolling Process

In the prepared hole 133 of the shaft material 112 formed by forging in the preceding step, for example, while a rolling tool such as a rolled tap is relatively rotated between the shaft material 112 and the tap itself is pushed into the prepared hole 133, although not shown in the Figs. Because of this, the outer peripheral shape of the rolled tap is rolled to the cylinder face 134 of the inner periphery of the prepared hole 133, whereby the valley 132a of the thread portion 132 is formed and the material portion pushed out by the rolling of the valley 132a bulges on its adjacent region, the peak 132b of the thread portion 132 is formed (refer to FIG. 15 or 16).

As mentioned above, the prepared hole 133 to form the threaded hole 131 is formed by forging so that the thread portion 132 can be formed by rolling on the inner periphery of the prepared hole 133 formed by forging, that is, the threaded hole 131 is formed by plastic processing. Therefore, chips (cutting powders, etc.) caused by cutting or like machining can be greatly reduced. Accordingly, it is possible to prevent chips from being deposited on other parts constituting the bearing (including constitutional parts of the motor) as contaminants in assembly, for example, getting in the lubricating oil filling the inside of the fluid lubrication bearing apparatus 101 while in use, or being transferred to the disk D to cause disk crash. Moreover, since the shaft material 112 and the prepared hole 133 of the threaded hole 131 are formed in a common forging step, such a forming step can be simplified and processing costs can be reduced. In addition, chips or other waste can be prevent before and after the forming process, whereby materials can be efficiently used to greatly cut on material costs. Alternatively, cycle time can be shortened by employing forging processes and rolling processes, improving the productivity.

(C-3) Correcting Process

To increase the dimensional accuracy of the shaft material 112 formed by a forging process, in particular the cylindricity of the face corresponding to the outer circumferential 113a surface of the shaft portion the shaft member 102 as a finished product (hereinafter simply referred to as the outer circumferential surface of the shaft portion), the outer circumferential surface 113a of the shaft portion of the shaft material 112 is subjected to a plastic processing for correcting the cylindricity after the forging process. Because of this, out of the outer circumferential surface 113a of the shaft portion of the shaft material 112, the outermost diameter surface 117 of the shaft portion 113 is corrected, the cylindricity of the face 117 subjected to the correcting process is improved to be in a desired range (for example, 10 µm or lower). Simultaneously, the cylinder face 116 of the upper end of the shaft portion 113 is also subjected to a correcting process, whereby the cylindricity of the cylinder face 116 is improved similarly. Note that as the correcting process of the cylindricity, rolling, drawing, ironing, sizing by pressing split-cavity molds (nipping) or various other processing methods can be employed.

(D) Grinding Step (D-1) Width Grinding

Both end faces of the shaft material 112 which have been subjected to the correcting process, i.e., the end face 113b of the shaft portion and the end face 114b of the flange portion 114 on the side opposite to the shaft portion (refer to FIG. 15) are ground relative to the outermost diameter surface 117 subjected to said correcting process out of the outer circumferential surface 113a of the shaft portion (the first grinding step). The grinding apparatus used in this grinding step comprises, as in the first embodiment, a carrier 41 retaining a plurality of the shaft materials 112 as workpieces; and a pair of grind stones 42, 42 which grind the end face 113b of the shaft portion of the shaft material 112 retained by the carrier 41 and the end face 114b of the flange portion 114 on the side opposite to the shaft portion, as shown in FIGS. 7 and 8. Note that other constitutions of the grinding apparatus 40 than this are based on the first embodiment, and their explanations are thus omitted.

As the carrier 41 rotates, the shaft material 112 is loaded into the notch 43a sequentially from a certain position. The loaded shaft material 112 traverses the end faces of the rotating grind stones 42, 42 from their outer diameter edge toward the inner diameter edge in such a state that it is prevented from falling off from the notch 43 by binding of the belt 44. Accordingly, both end faces of the shaft material 112, namely the end face 113b of the shaft portion an the end face 114b of the flange portion 114 on the side opposite to the shaft portion, are ground by the end face s of the grind stones 42, 42. Moreover, the width of the shaft material 112 in the axial direction (the entire length including the flange portion 114) is finished to have a predetermined size.

(D-2) Full Face Grinding Process

Subsequently, the outer circumferential surface 112a of the shaft material 112 and the end face 114a of the flange portion 114 on the shaft portion side are ground relative to the ground end faces 113b, 114b of the shaft material 112 (both end faces 121b, 122b of the shaft member 102) (the second grinding step). As in the first embodiment, the grinding apparatus used in this grinding step performs plunge-grinding by the grind stone 53 with the back plate 54 and pressure plate 55 pressed against both end faces of the shaft material 112, as shown in FIG. 9. The correcting process face 117 of the shaft material 112 is rotatably supported by a shoe 52. Note that other constitutions of the grinding apparatus 50 than this is based on the first embodiment, and their explanations are thus omitted.

Grinding in the grinding apparatus 50 of the above constitution is performed in the following procedure. To begin with, while the shaft material 112 and the grind stone 53 are in rotation, the grind stone 53 is fed obliquely (the direction of arrow 1 in FIG. 9), a plane grinding portion 56b of the grind stone 53 is pressed against the end face 114a of the flange portion on the shaft portion side of the shaft material 112 to grind mainly the end face 114a on the shaft portion side. The shaft portion side end face 122a in the flange portion 122 of the shaft member 102 is thus formed. Subsequently, the grind stone 53 is fed in the direction perpendicularly intersecting the rotation axis of the shaft material 112 (the direction of arrow 2 in FIG. 9), and then the cylinder grinding portion 56a of the grind stone 53 is pressed against the outer circumferential surface 113a of the shaft portion 113 of the shaft material 112 and the outer circumferential surface 114C of the flange portion 114 to grind the faces 113a, 114C. Accordingly, out of the outer circumferential surface of the shaft portion 121 of the shaft member 102, the radial bearing faces 123a, 123b and the region corresponding to the cylinder face 125 are ground and the tapered face 124, the outer circumferential surface 122C of the flange portion 122, and the recess portions 126-128 are further formed.

(D-3) Finish Grinding Process (D-2) Among the faces which have been ground in the full face grinding process, the radial bearing faces 123a, 123b of the shaft member 102 and the region corresponding to the cylinder face 125 are subjected to the final finish grinding process. As in the first embodiment, a grinding apparatus used in this grinding process performs plunge grinding on the rotating shaft material 112 held between the back plate 64 and pressure plate 65 by the grind stone 63 with the cylinder grinder shown in FIG. 10. Note that other constitutions of the grinding apparatus 60 are based on the first embodiment, and their explanations are thus omitted.

In the grinding apparatus 60 having the above constitution, the radial bearing faces 123a, 123b and the region corresponding to the cylinder face 125 are ground by providing the rotating grind stone 63 with the feed in the radial direction, and these regions are finished to have the final surface accuracy.

After the above (C) forming step and (D) grinding step, heat treatment and cleaning process, if necessary, are performed so that the shaft member 102 shown in FIG. 11 is completed.

The shaft member 102, as long as it is produced by the above production method, by forming the prepared hole 133 with high accuracy, the forming accuracy of the threaded hole 131, for example, the coaxiality of the center line of the pitch circle of the thread portion relative to the axis of the shaft member 102 can be suppressed to 0.2 mm or lower. Moreover, according to the above production method, relative to the radial bearing faces 123a, 123b formed on the outer periphery of the shaft portion 121, it is also possible to form the shaft member 102 with suppressed perpendicularity of both end faces 122a, 122b of the flange portion 122 (thrust bearing face) and suppressed value of the perpendicularity of the end face 121b of the of the shaft portion. Among these, the end face 121b of the shaft portion not only serves as a reference plane for grinding the outer circumferential surface of the shaft portion 121 and the upper end face of the flange portion 122 (thrust bearing face 122a side), but also serves as a contact surface when the clamper 110 which holds the disk D between the disk hub 3 and itself to fix it is fixed on the shaft member 102 (screw fixing).

Accordingly, as mentioned above, the forming accuracy of the threaded hole 131 (in particular, the coaxiality of the thread portion 132) can be increased, and the value of the perpendicularity of the end face 121b of the of the shaft portion can be also suppressed to a low level, whereby the mounting accuracy on the shaft member 102 of the clamper 110 can be increased. As a result, the disk D can be fixed with the value of the perpendicularity relative to the shaft member 102 suppressed to a low level, and runout of the disk D relative to the shaft member 102 when the shaft member 102 is in rotation can be suppressed. Hence, excellent disk rotation can be obtained.

According to the above production method, the cylindricity of the radial bearing faces 123$a$, 123$b$ formed on the outer periphery of the shaft portion 121 can also be finished highly accurately. Because of this, for example, variation in the circumferential or axial dimension of the radial bearing gap formed between the inner periphery of the bearing sleeve 8 in the fluid lubrication bearing apparatus 101 and the outer periphery of the shaft portion 121 can be suppressed to be in a predetermined range, and the bearing performance can be thus prevented from being adversely affected by the variation of the above radial bearing gap. Furthermore, the region corresponding to the cylinder face 125 of the shaft portion 121 is subjected to the finish grinding process (refer to FIG. 10) so that the cylindricity of the cylinder face 125 can also be finished highly accurately, increasing the mounting accuracy in mounting the disk hub 3 or other components on the shaft member 102. This can further increase the mounting accuracy of the clamper 110 and the disk D clamped between the clamper 110 and disk hub 3 relative to shaft member 102, thereby further improving the motor performance.

Note that the example described in the above embodiment is so constructed that a radially curved surface is formed in the prepared hole 133 at the connecting portion 134$a$ between the conical surface 135 and cylinder face 134 and that a radially curved surface is formed on the top 135$a$ of the conical surface 135, but it is not limited to this configuration. For example, as for the connecting portion 134$a$, there may be formed any face as long as the it smoothly connects the conical surface 135 and the cylinder face 134. Moreover, as for the top 135$a$, there may be formed any face as long as the top 135$a$ is removed from the top 135$a$, for example, a flat face where the top 135$a$ is removed (truncated conical surface) may be formed instead of a radially curved surface.

A third embodiment of the present invention will be described below with reference to FIGS. 17-23.

Figure 18:
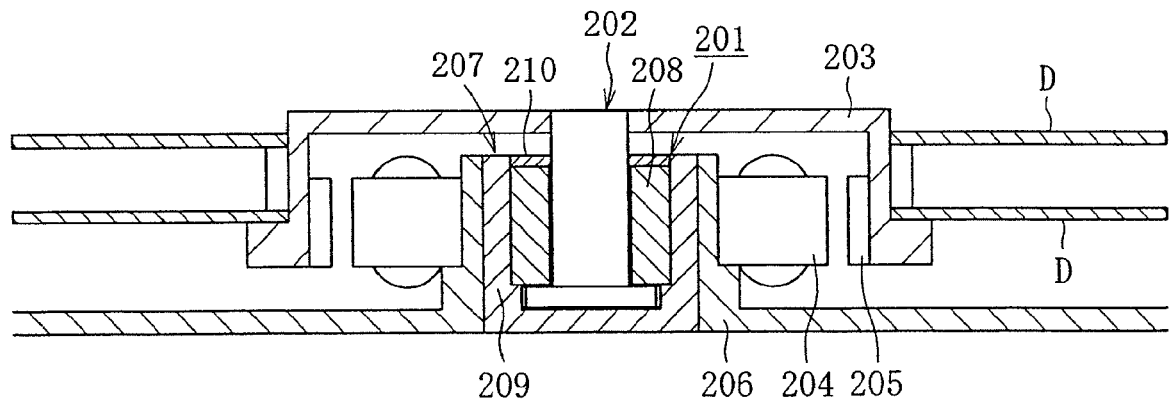
FIG. 18 is a cross-sectional view of a spindle motor for information appliances integrating a fluid lubrication bearing apparatus.

FIG. 18 conceptionally shows one constitutional example of a spindle motor for information appliances incorporating a fluid lubrication bearing apparatus 201 according to the third embodiment of the present. This spindle motor is used for disk drive units such as HDDs, and comprises a fluid lubrication bearing apparatus (hydrodynamic bearing apparatus) 201 which rotatably supports the shaft member 202 fixing the hub 203 in a non-contact manner; for example, a stator coil 204 and a rotor magnet 205 opposing each other across a gap in the radial direction; and a bracket 206. The stator coil 204 is mounted on the outer diameter side of the bracket 206, and the rotor magnet 205 is mounted on outer periphery of the hub 203. The bearing component 207 of the fluid lubrication bearing apparatus 201 is fixed on the inner periphery of the bracket 206. Moreover, one or more of the disk D is retained on the hub 203. In FIG. 18, two of the disk D is retained on the hub 203. In the thus constructed spindle motor, when the stator coil 204 is energized, the rotor magnet 205 is rotated by the excitation produced between the stator coil 204 and rotor magnet 205, whereby the disk D retained on the shaft member 202 and the hub 203 which is fixed on shaft member 202 are rotated unitarily with the shaft member 202.

Figure 19:
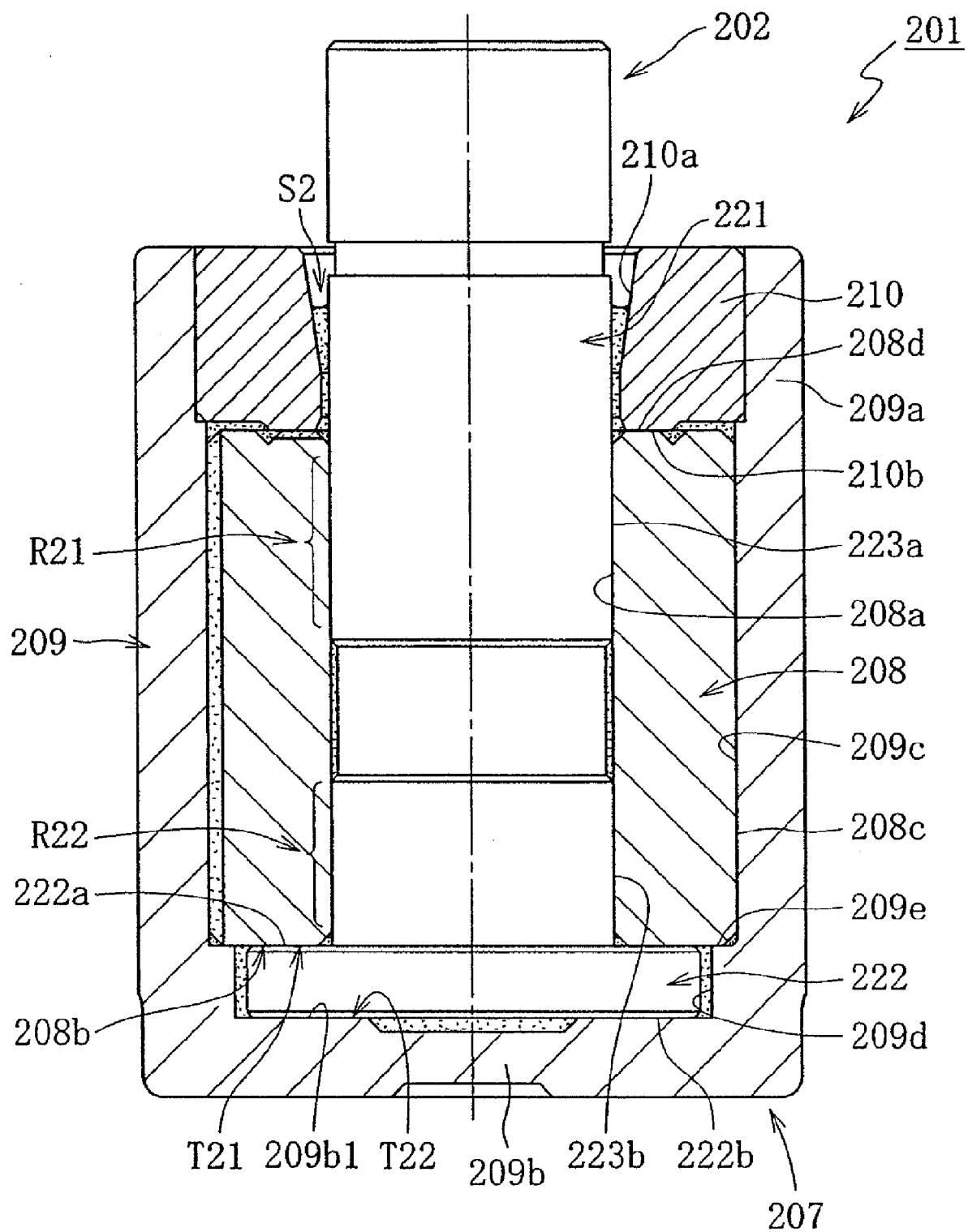
FIG. 19 is a cross-sectional view of a fluid lubrication bearing apparatus.

FIG. 19 shows the fluid lubrication bearing apparatus 201. This fluid lubrication bearing apparatus 201 mainly comprises a bearing component 207 whose one end opens, a shaft member 202 which is inserted at the inner periphery of the bearing component 207 and rotates relative to the bearing component 207. Note that for the sake of explanation, the side of a bottom 209$b$ of the housing portion 209 constituting the bearing component 207 is referred to as the lower side, while the side opposite to the bottom 209$b$ is referred to as the upper side in the description below.

The bearing component 207 has such a shape that it opens at least at one axial end, and separately comprises an approximately cylindrical sleeve portion 208 and a housing portion 209 positioned on the outer diameter side of the sleeve portion 208 in this embodiment.

The sleeve portion 208 is, for example, formed in the form of a cylinder with a metallic non-porous body or a porous body made of a sintered metal. In this embodiment, the sleeve portion 208 is formed in the form of a cylinder form with a porous body made of a sintered metal comprising copper as a main ingredient, and is fixed on the inner periphery face (large diameter face 209$c$) of the housing portion 209 by, for example, adhesion (including loose adhesion and press fitting adhesion), press fitting, welding (for example, ultrasonic welding) or other suitable means. Of course, the sleeve portion 208 can be also formed from non-metallic materials such as resins, ceramics, etc.

On the entire surface of the inner periphery face 208$a$ of the sleeve portion 208 or a part thereof a cylinder region, a region in which a plurality of hydrodynamic grooves are arranged is formed. In this embodiment, for example, a region in which a plurality of hydrodynamic grooves is arranged in a herringbone shape is formed at two axially separated positions, as in FIG. 4.

In the entire annular region of the lower end face 208$b$ of the sleeve portion 208 or a part thereof, a region in which a plurality of hydrodynamic groove are spirally arranged as a portion for producing thrust hydrodynamic pressure, for example, as in FIG. 5, is formed. This region in which the hydrodynamic grooves are formed faces the upper end face 222$a$ of the flange portion 222 as a thrust bearing face. While the shaft member 202 is in rotation, the region forms the thrust bearing gap of a first thrust bearing portion T21 described later between the itself and the upper end face 222$a$ (refer to FIG. 19).

The housing portion 209 is formed of a metal or a resin, and has a cylinder part 209$a$, and a bottom 209$b$ integrally or separately formed at the lower end of the cylinder part 209$a$. In this embodiment, the bottom 209$b$ is formed integrally with the cylinder part 209$a$.

In the entire annular region of the upper end face 209$b$1 of the bottom 209$b$ or a part thereof, a region in which a plurality of hydrodynamic groove are spirally (the spiral direction is opposite to that in FIG. 5) arranged as a portion for producing thrust hydrodynamic pressure, for example, as in FIG. 5, is formed. This region in which the hydrodynamic grooves are formed faces the lower end face 222$b$ of the flange portion 222 as a thrust bearing face. While the shaft member 202 is in rotation, the region forms the thrust bearing gap of a second thrust bearing portion T22 described later between itself and the lower end face 222$b$ (refer to FIG. 19).

The inner periphery face of the housing portion 209 is mainly constituted of a large diameter face 209$c$ where the sleeve portion 208 is fixed, a small diameter face 209$d$ which is provided at the lower end of the large diameter face 209$c$ and has a diameter smaller than that of the large diameter face 209$c$. In this embodiment, the upper end face 209$e$ is formed on the shoulder between the large diameter face 209$c$ and small diameter face 209$d$. In the state that the lower end face 208$b$ of the sleeve portion 208 is in contact with the upper end face 209$e$, the width in the axial direction from the lower end face 208$b$ of the sleeve portion 208 to the upper end face 209$b$1 of the bottom 209$b$ is set to be equal to the axial dimension of the small diameter face 209d. Accordingly, (the sum of) the thrust bearing gap described later can be obtained highly accurately by controlling the axial dimension of the small diameter face 209d highly accurately.

A sealing portion 210 as a sealing means is formed, for example, of a metallic material or a resin material separately from the housing portion 209, and is fixed by press fitting, adhesion, deposition, welding or other means on the inner periphery of the upper end portion of the cylinder part 209a of the housing portion 209. In this embodiment, fixing of the sealing portion 210 is conducted with the lower end face 210b of the sealing portion 210 in contact the upper end face 208d of the sleeve portion 208 (for example, refer to FIG. 19).

A tapered face is formed on the inner periphery face 210a of the sealing portion 210. Between this tapered face and the outer circumferential surface of the shaft portion 221 facing the tapered face, an annular sealing space S2 whose radial dimension upwardly and gradually increases is formed. A lubricating oil is placed in the inner space of the housing portion 209 sealed by the sealing portion 210, and the inside of the housing portion 209 is filled with the lubricating oil (dotted region in FIG. 19). In this state, the oil level of the lubricating oil is maintained within the range of the sealing space S2.

Figure 17:
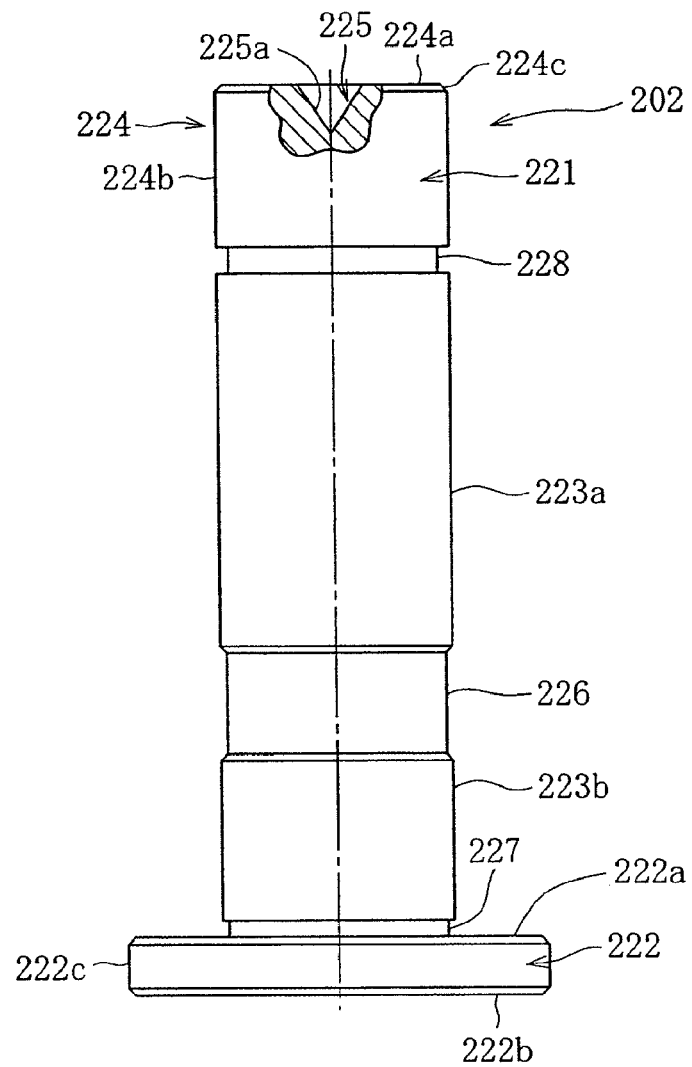
FIG. 17 is a side elevational view of a shaft member for a fluid lubrication bearing apparatus according to the third embodiment of the present invention.

As shown in FIG. 17, the shaft member 202 is formed of a metallic material such as stainless steel, and has a T-shaped cross section integrally comprising the shaft portion 221 and the flange portion 222 provided at the lower end of the shaft portion 221. On the outer periphery of the shaft portion 221, radial bearing faces 223a, 223b facing regions on the inner periphery face 208a of the sleeve portion 208 where upper and lower hydrodynamic grooves are formed, respectively, are formed at two axially separated positions.

A concave 225 is formed on the tip face 224a of the tip portion 224. In this embodiment, the concave 225 consists a plastically processed surface 225a, and is so configured that its diameter gradually decreases from the tip face 224a side toward the center of the shaft portion 221. A cylindrical outer circumferential surface 224b is provided at the tip portion 224 of the shaft portion 221 positioned on the opposite side in the axial direction of the flange portion 222, and a hub 203 is fixed on this outer circumferential surface 224b by press fitting, adhesion or other means. Note that annular recess portions 226, 227, 228 are formed between the two radial bearing faces 223a, 223b, between the lower radial bearing face 223b and the flange portion 222, and between the upper radial bearing face 223a and outer circumferential surface 224b, respectively.

In the fluid lubrication bearing apparatus 201 having the above constitution, while the shaft member 202 is in rotation, a hydrodynamic groove formation region formed on the inner periphery face 208a of the sleeve portion 208 forms a radial bearing gap between itself and the radial bearing faces 223a, 223b of the shaft portion 221 facing it. In addition, as the shaft member 202 rotates, the lubricating oil in the above radial bearing gap is pushed to the axial center side of the hydrodynamic groove (refer to FIG. 4), and its pressure is increased. As mentioned above, a first radial bearing portion R21 and a second radial bearing portion R22 which support the shaft portion 221 in a non-contact manner in the radial direction are constituted, respectively, by the hydrodynamic effect of the lubricating oil produced by the hydrodynamic grooves.

Simultaneously, the pressure of the lubricating oil film formed in the thrust bearing gap between the lower end face 208b of the sleeve portion 208 (hydrodynamic groove formation region) and the upper end face 222a of the flange portion 222 facing it, and the pressure in the thrust bearing gap between a region formed on the upper end face 209b1 of the bottom of the housing portion 209 where the hydrodynamic grooves are formed and the lower end face 222b of the flange portion 222 facing it are increased by the hydrodynamic effect of the hydrodynamic grooves. In addition, a first thrust bearing portion T21 and a second thrust bearing portion T22 which support the flange portion 222 (shaft member 202) in the thrust direction in a non-contact manner are constituted by the pressure of these oil films, respectively.

The production method of the shaft member 202 constituting the above fluid lubrication bearing apparatus 201 will be described below.

The shaft member 202 is produced mainly in the following two steps: a forming step (E), and a grinding step (F). In this procedure, the (E) forming step comprises a shaft material forging process (E-1) and a shaft portion correcting process (E-2). Moreover, the (F) grinding step comprises a width grinding process (F-1), a full face grinding process (F-2), and finish grinding process (F-3). In this embodiment, the (E-1) shaft material forging process is mainly described.

(E) Forming Step
(E-1) Shaft Material Forging Process

Figure 20:
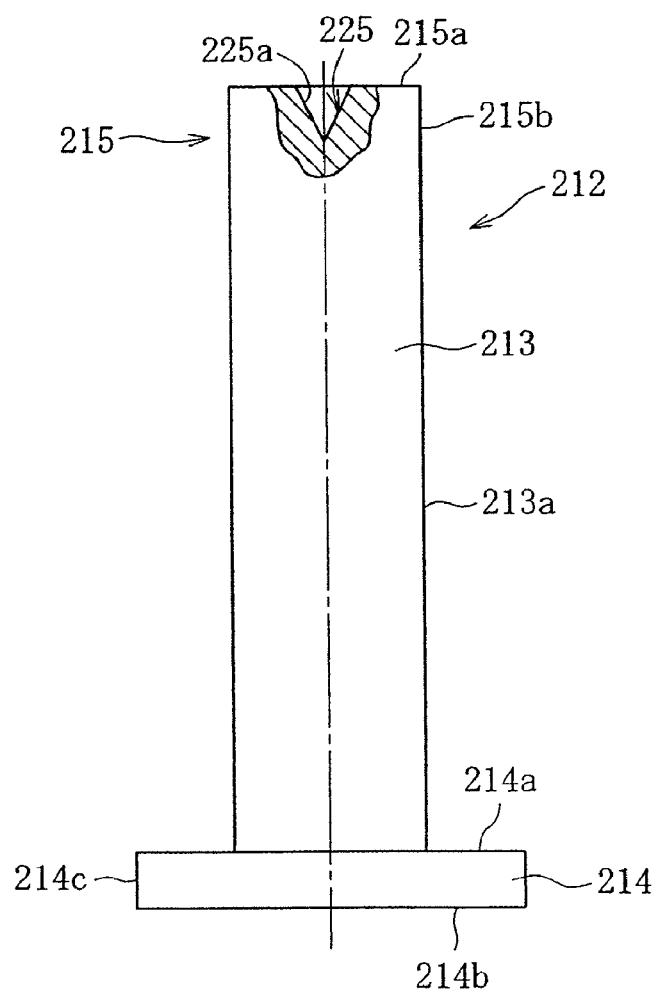
FIG. 20 is a side elevational view of a shaft material formed by a forging process.

To begin with, a material of the shaft member 202 to be formed, i.e., a bar material made of metal such as stainless steel is compression-formed (forging process) by using molds, for example, in a cold state, so that, for example, the shaft material 212 integrally having the region corresponding to the shaft portion (hereinafter referred to simply as a shaft portion) 213 and the region corresponding to the flange portion (hereinafter referred to simply as a flange portion.) 214 is formed {shaft material forging process (E-1)} as shown in FIG. 20.

As mentioned above, if the shaft material 212 is formed by forging, no cutting powders are produced by processing, wasted of the material can be reduced, and a cleaning step after the process can also be simplified. Moreover, since it is a pressing operation, the cycle time per one piece of the shaft material 212 can be shortened, improving the productivity.

Figure 21:
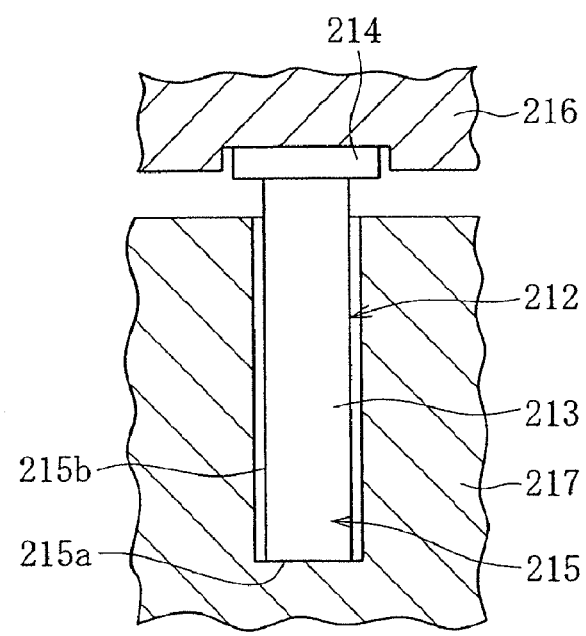
FIG. 21 is a schematic illustration of an example of a mold used in a forging process.

Methods which can be employed as the above forging process include extrusion, upsetting process and other various processes, and a processing method suitable for the shape of the processed article is selected. For example, in the shaft material 212 in the shape shown in FIG. 20, to increase the forming accuracy of the shaft portion 213, for example, it is possible to employ a method comprising roughly forming the shaft material 212 from a wire by a different forging, and then compressing the shaft material 212 by mold clamping with molds 216, 217 in the axial direction to cause the shaft portion 213 to overhang in the radial direction, as shown in FIG. 21.

Figure 22:
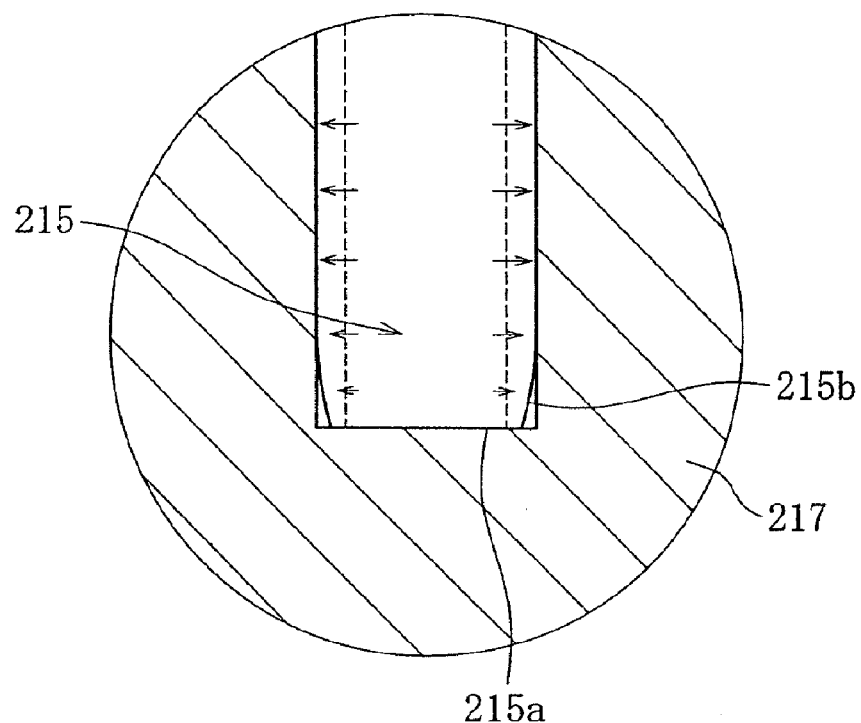
FIG. 22 is an expanded view which conceptionally shows a known forming/forging manner of a shaft material.

In this case, although sufficient compressive force can be applied to the portions in the vicinity of the dividing face of the molds 216, 217 such as the flange portion 214 and the end on the flange portion 214 side of the shaft portion 213, compressive force is not sufficiently transmitted to the portions which are far from the dividing face such as the tip portion 215 of the shaft portion 213 on the side opposite to the flange portion 214. Consequently, deformation in the radial direction associated with compression becomes insufficient in particular at the tip portion 215. For example, as shown in FIG. 22, the closer to the tip face 215a, the tip portion 215 of the shaft portion 213 tends to be tapered.

Figure 23:
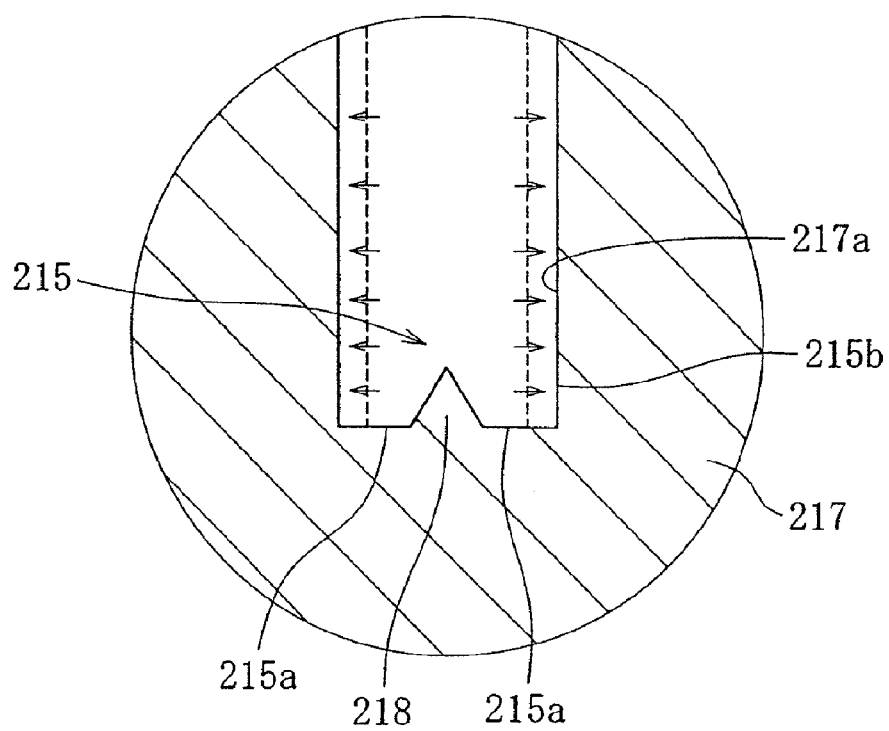
FIG. 23 is an expanded view which conceptionally shows a forming/forging manner of a shaft material according to the present invention.

In contrast, for example, if a protrusion 218 of the shape shown in FIG. 23 is provided at the center portion of a formed surface 217a corresponding to the tip face 215a of the mold 217, a concave 225 having the shape corresponding to the protrusion 218a is formed on the tip face 215a of the tip of the shaft portion 215. Since this concave 225 is formed by pushing the protrusion 218 into the tip face 215a to cause the corresponding region to undergo plastic deformation, the tip portion 215 is caused to overhang by such plastic deformation, whereby the shortage of plastic deformation at the tip portion 215 can be compensated. In this embodiment, plastic flow in the outer radial direction occurs uniformly in the axial direction and the outer circumferential surface 215b overhang to the shape corresponding to the inner periphery face 217a of the mold 217, whereby tapering of the tip portion 215 can be prevented and the tip portion 215 having a constant diameter can be formed.

Note that in the example shown in FIG. 23, described is the case where the concave 225 is formed on the tip face 215a so that the tip portion 215 is caused to overhang and the tip portion 215 is deformed until the shape in which the diameter of the outer circumferential surface 215b becomes constant (i.e., an intermediate shape) is reached, but it is not necessarily be caused to overhang to such a degree. For example, the shape of the concave 225 (protrusion 218) and its size can be set in a grinding step described later so that the tip portion 215 is caused to overhang until the final finished shape is reached. In this embodiment, the final finished shape of the tip portion 224 of the shaft member 202 as a finished product is defined by the outer circumferential surface 224b of the tip portion 224, tip face 224a and a chamfer 224C provided between the faces 224a, 224b. Therefore, in this case, the following grinding step is enabled by causing it to overhang somewhat larger than the shape defined by the faces 224a, 224b, 224C, obtaining the shaft member 202 having high dimensional accuracy.

Moreover, in this embodiment, since the concave 225 is in such a shape that its diameter gradually decreases from the tip face 224a side to center of the shaft portion 221, the closer to the tip face 215a side in plastic processing of the concave 225, the greater the amount of deformation in the outer radial direction. Therefore, tapering of the tip portion 215 can be prevented and the shaft portion 213 can be formed more accurately by forming the concave 225 in such a shape.

The forming/forging step can be performed, as mentioned above, separately in two or more forging steps, or for example, a wire having constant diameter can be formed in one forging step. Moreover, in this embodiment, the case where forming of the shaft material 212 and forming of the concave 225 are performed with a common mold is described, but forming of both is not necessarily performed simultaneously. For example, after forming the shaft material 212 by forging, the same action as that mentioned above can be obtained as above by forming the concave 225 by forging.

(E-2) Correcting Process

To increase the dimensional accuracy of the shaft material 212 formed by a forging process, in particular the cylindricity of the face corresponding to the outer circumferential surface 213a of the shaft portion of the shaft member 2 as a finished product (hereinafter referred to simply as the outer circumferential surface of the shaft portion), a plastic processing for correcting the cylindricity is performed on the outer circumferential surface 213a of the shaft portion of the shaft material 212 after being subjected to the forging process. Accordingly, the outer circumferential surface 213a of the shaft portion of the shaft material 212 is corrected, and the cylindricity of the face 213 subjected to the correcting process is improved to be in a desired range (for example, 10 μm or lower). When the outer circumferential surface 215b of the tip portion 215 is formed to have the same diameter as the outer circumferential surface 213a of the shaft portion, the outer circumferential surface 215b is also subjected to a correcting process, and the cylindricity of the outer circumferential surface 215b is improved similarly.

(F) Grinding Step (F-1) Width Grinding

Both end faces of the shaft material 212 which has been subjected to the correcting process, i.e., the tip face 215a of the shaft portion and the end face 214b of the flange portion 214 on the side opposite to the shaft portion (refer to FIG. 20) is ground relative to the outermost diameter surface 217 subjected to said correcting process of the outer circumferential surface 213a of the shaft portion (The first grinding step). A grinding apparatus used in this grinding step is, for example, similar to the grinding apparatus 40 shown in FIGS. 7 and 8. Since other constitutions, arrangements and processing manners are based on the first embodiment, their explanations will be omitted.

By such a grinding step, the tip face 215a of the shaft portion and the end face 214b of the flange portion 214 on the side opposite to the shaft portion are ground. At this time, because the corrected face 213a of the shaft material 212 is supported by the carrier 41 and this corrected face 213a have high cylindricity, if the perpendicularity of the rotation axis of the grind stone 42 and the grinding surface of the grind stone 42, and the parallelism of the rotation axis of the grind stone 42 and the rotation axis of the carrier 41, etc. are highly accurately controlled in advance, said both end faces 215a, 214b of the shaft material 212 can be highly accurately finished relative to this corrected face 213a, and the value of the perpendicularity relative to the corrected face 213a can be suppressed to a low level. Moreover, the axial width of the shaft material 212 (the entire length including the flange portion 214) is finished to have a predetermined size.

(F-2) Full Face Grinding Process

Subsequently, the outer circumferential surface 213a and the end face 214a of the flange portion 214 on the shaft portion side of the shaft material 212 relative to both end faces 215a, 214b of the ground shaft material 212 are ground (second grinding step). The grinding apparatus used in this grinding step is, for example, similar to the grinding apparatus 50 shown in FIG. 9.

Moreover, a grind stone used in this grinding is a formed grind stone comprising a grinding surface corresponding to the outer circumferential surface shape of the shaft member 202 as a finished product, and, although not shown in the Figs., comprises radial bearing faces 223a, 223b; outer circumferential surface 224b of the tip portion; a chamfer 224c; recess portions 226-228, outer circumferential surface 222c of the flange portion 222; and a grinding surface which grinds a region corresponding to upper end face 222a of the flange portion 222. Since other constitutions, arrangements and processing manners are based on the first embodiment, their explanations are omitted.

By such a grinding process, out of the outer circumferential surface of the shaft portion 221 of the shaft member 202, the radial bearing faces 223a, 223b and the outer circumferential surface 224b of the tip portion, and the region corresponding to the chamfer 224C are ground, and the outer circumferential surface 222C of the flange portion 222 and the recess portions 226-228, the upper end face 222a of the flange portion 222 are further formed. In this grinding step, since the accuracy setting of the perpendicularity of both end faces 215a, 214b of the shaft material 212 (both end faces 224a, 222b of the shaft member 202) has been conducted previously in the width grinding, each of the to-be-ground surfaces can be ground highly accurately.

(F-3) Finish Grinding Process

Among the faces which have been ground in full face grinding process, the radial bearing faces 223a, 223b of the shaft member 202, and the region corresponding to the outer circumferential surface 224b of the tip portion are subjected to the final finish grinding process. A grinding apparatus used in this grinding is, for example, similar to the grinding apparatus 60 shown in FIG. 10. Since other constitutions, arrangements and processing manners are based on the first embodiment, their explanations will be omitted.

By such a grinding process, the radial bearing faces 223a, 223b and the region corresponding to the outer circumferential surface 224b of the tip portion are ground, and these regions are finished to have the final surface accuracy.

After the above (E) forming step and (F) grinding step, heat treatment and cleaning process, if necessary, are performed to complete the shaft member 202 shown in FIG. 17.

The shaft member 202, as long as it is produced by the production method mentioned above, can be formed so that the shaft portion 221, in particular the tip portion 224 of the shaft portion 221 is caused to overhang until at least a final finished shape is reached, and said outer circumferential surface 215b can be finished highly accurately by the following grinding. Accordingly, a fixing area between the hub 203 and said outer circumferential surface 215b can be ensured to obtain high fixing strength and fixing accuracy between the hub 203 and the outer circumferential surface 215b. Moreover, according to such a constitution, it is possible to readily deal with the elongation of the shaft member 202 by adjusting the size of the concave 225 formed on the tip face 224a of the shaft portion or the like.

In the above embodiment (first embodiment), the case where the radial bearing faces 23a, 23b of the shaft member 2 and thrust bearing faces 22a, 22b are all smooth surface having no hydrodynamic grooves was exemplified, but hydrodynamic grooves may be formed on these bearing faces. In this case, the radial hydrodynamic groove can be formed by rolling or forging, and the thrust hydrodynamic grooves can be formed by pressing or forging at the stage preceding the full face grinding process shown in FIG. 8. Similarly, hydrodynamic grooves can be also formed on the shaft member 102 according to the second embodiment and the shaft member 202 according to third embodiment.

Moreover, in the embodiments described above, as the hydrodynamic bearing constituting the radial bearing portions R1, R2 and the thrust bearing portions T1, T2, for example, bearings using hydrodynamic pressure producing parts comprising hydrodynamic grooves arranged in a herringbone shape and a spiral shape are shown as examples, but the constitution of the hydrodynamic pressure producing parts are not limited to these. Examples of the radial bearing portions R1, R2 used include a multirobe bearing, step bearing, taper bearing, taper flat bearing or the like. Examples of the thrust bearing portions T1, T2 used include a step pocket bearing, tapered pocket bearing, tapered flat bearing or the like. Hydrodynamic bearings having similar constitutions can be used for the radial bearing portions R11, R12 and the thrust bearing portions T11, T12 according to the second embodiment and the radial bearing portions R21, R22 and thrust bearing portions T21, T22 according to the third embodiment.

Moreover, as for the second and third embodiments, the radial bearing portions R11, R12 and thrust bearing portions T11, T12 can be also constituted of bearings other than hydrodynamic bearings, for example, a pivot bearing can be used as the thrust bearing portion, and a cylindrical bearing as a radial bearing portion.

Moreover, in the embodiments described above, a lubricating oil is mentioned as an example of a fluid which fills the inside of the hydrodynamic bearing apparatus 1, and produces hydrodynamic effect in the radial bearing gap between the bearing sleeve 8 and the shaft member 2 and in the thrust bearing gaps W1, W2 between the bearing sleeve 8 and housing 7 and the shaft member 2. However, such a fluid is not particularly limited to this fluid. As a fluid which can produce hydrodynamic effect in the bearing gaps having hydrodynamic grooves, for example, a gas such as air and a lubricant having fluidity such as a magnetic fluid may be used. Of course, similar kind of fluids may be used for the fluid lubrication bearing apparatus 101, 201 according to the second and third embodiments.

The fluid lubrication bearing apparatus according to the present invention is suitable for information appliances, for example, Magnetic disk apparatuses such as HDD, optical disk apparatuses such as CD-ROM, CD-R/RW and DVD-ROM/RAM, spindle motors for magneto-optic disk apparatuses such as MD and MO, polygon scanner motors of laser beam printers (LBP), color wheel motors of projectors, or small motors such as fan motors.

The invention claimed is:

1. A method of producing a metallic shaft member for a fluid lubrication bearing apparatus, the metallic shaft member integrally including a shaft portion and a flange portion provided on an end of the shaft portion, the method comprising:

forming the shaft portion with a forging process including compressing a shaft material integrally having a region corresponding to the shaft portion and a region corresponding to the flange portion provided on an end of the region corresponding to the shaft portion in an axial direction of the shaft material by mold clamping a set of molds having a constant diameter that is larger than an initial constant diameter of the region of the shaft material corresponding to the shaft portion such that the region corresponding to the shaft portion deforms with an increase in diameter; and forming a concave at a tip face of a tip portion of the region corresponding to the shaft portion by applying compression force to the region corresponding to the flange portion by mold clamping the set of molds and pushing the shaft material against a protrusion at a bottom of a mold of the set of molds, during the forming of the shaft portion with the forging process, such that the tip portion deforms with an increase in diameter by a plastic flow with the forming of the concave, an amount of deformation of the tip portion being uniform in the axial direction.

2. A method of producing a shaft member according to claim 1, wherein
the forming of the concave comprises pushing the shaft material against the protrusion, during the forming of the shaft portion with the forging process, such that the tip portion deforms with the increase in diameter until the tip portion reaches a final finished shape or an intermediate shape.

3. A method of producing a shaft member according to claim 2, further comprising
processing the tip portion of the shaft portion having the intermediate shape by grinding after the forging process to achieve the final finished shape defined by an outer circumferential surface of a tip of the shaft portion, the tip face of the shaft portion and a chamfer between the outer circumferential surface and the tip face.

* * * * *